July 6, 1965 W. STUMPF ETAL 3,193,136
COIL FEEDING APPARATUS
Filed Oct. 22, 1959 17 Sheets-Sheet 1

INVENTORS
WALTER STUMPF
HELMUT STURM
BY
ATTORNEYS

July 6, 1965 W. STUMPF ETAL 3,193,136
COIL FEEDING APPARATUS
Filed Oct. 22, 1959 17 Sheets-Sheet 3

INVENTORS
WALTER STUMPF
HELMUT STURM
BY
Soans, Anderson, Luedeka & Fikh
ATTORNEYS

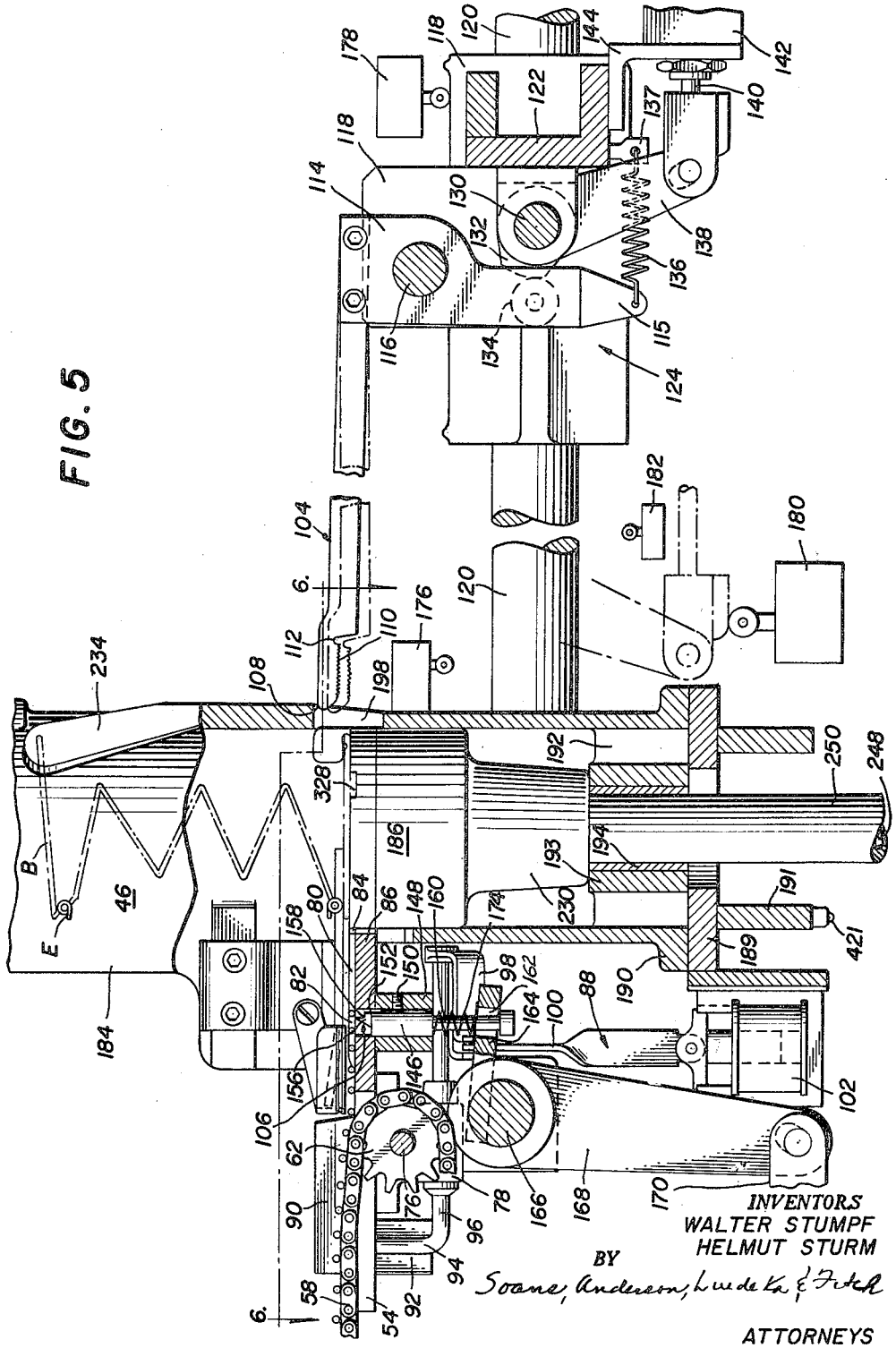

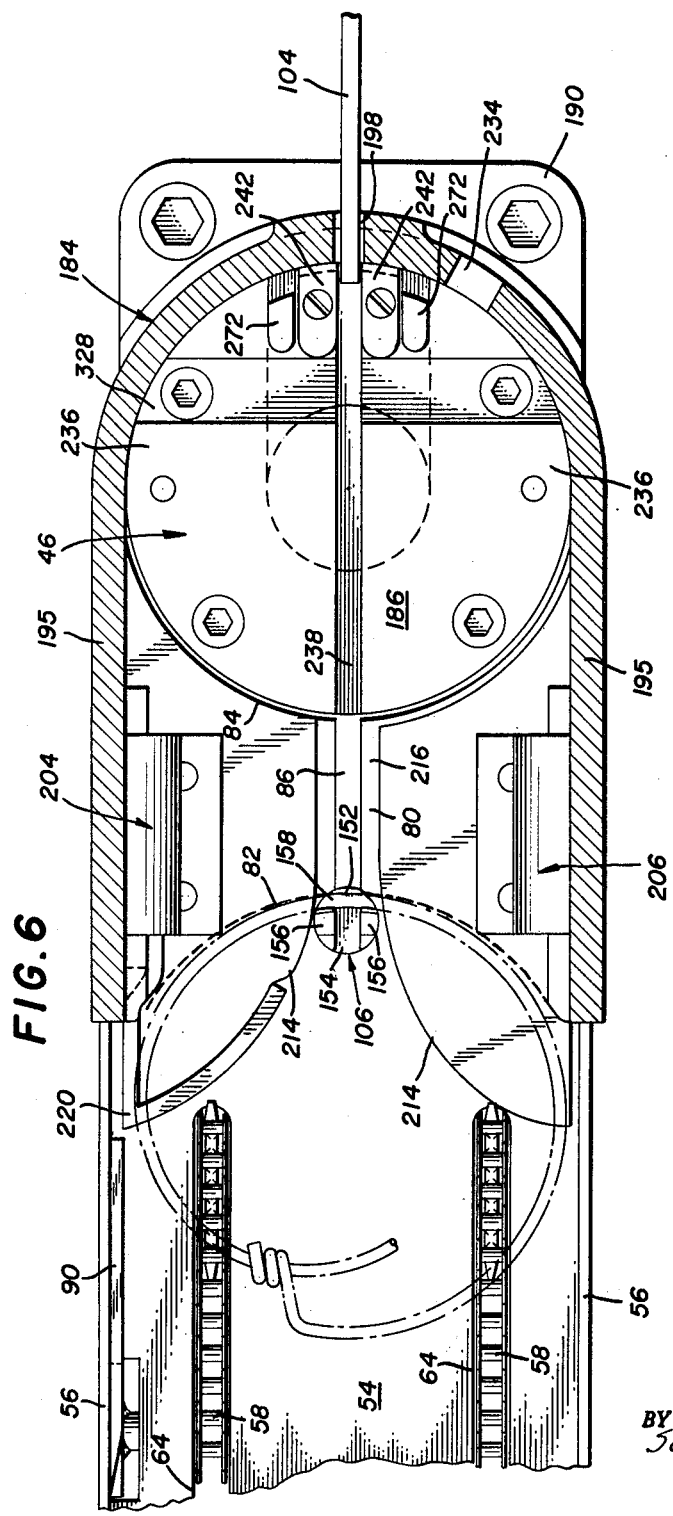

July 6, 1965 W. STUMPF ETAL 3,193,136
COIL FEEDING APPARATUS
Filed Oct. 22, 1959 17 Sheets-Sheet 6
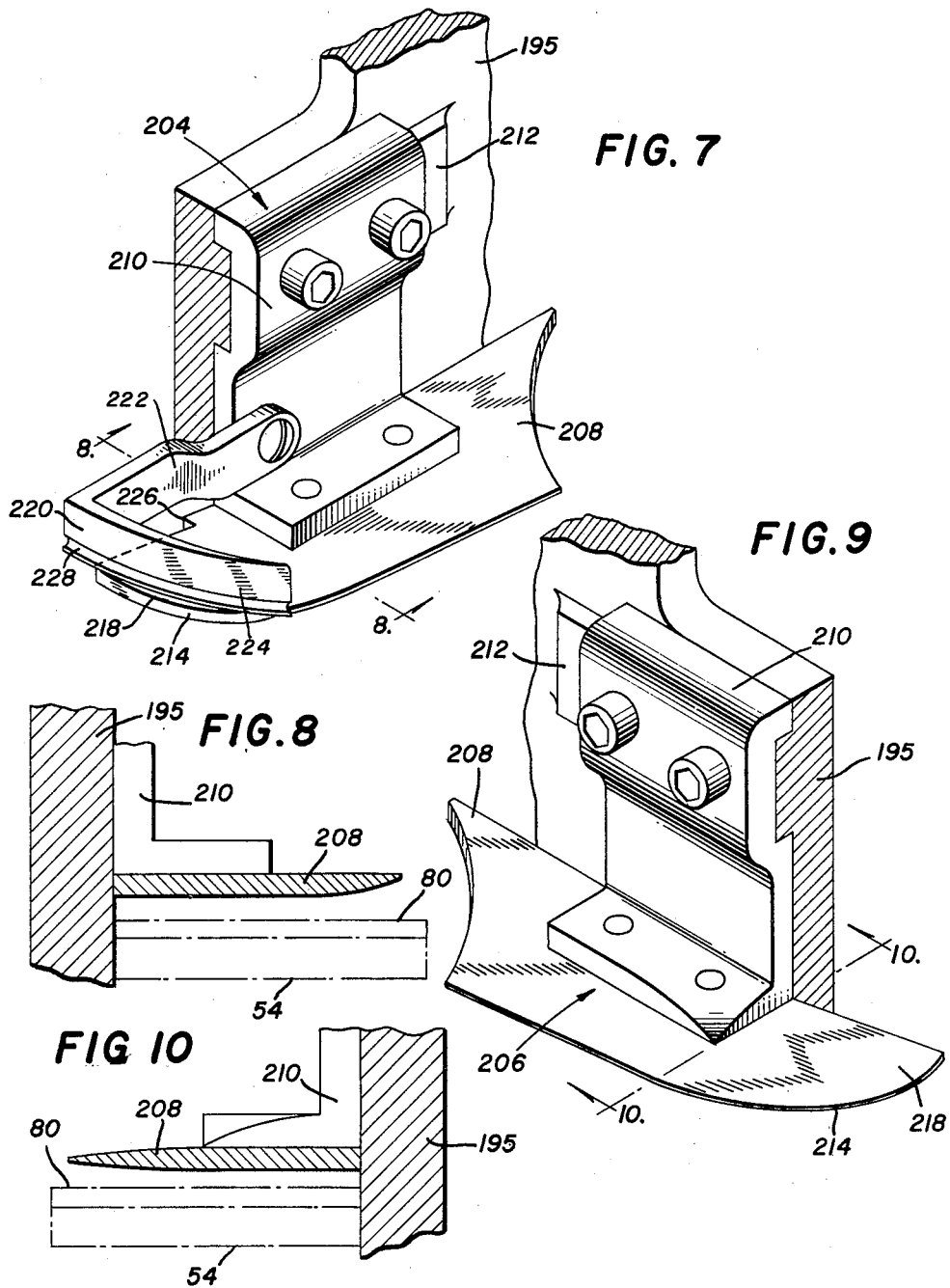
INVENTORS
WALTER STUMPF
HELMUT STURM
BY
Soans, Anderson, Luedeka & Fitch
ATTORNEYS July 6, 1965

W. STUMPF ETAL 3,193,136

COIL FEEDING APPARATUS

Filed Oct. 22, 1959

INVENTORS
WALTER STUMPF
HELMUT STURM
BY
Soans, Anderson, Luedeka & Fitch

ATTORNEYS

July 6, 1965

W. STUMPF ETAL 3,193,136

COIL FEEDING APPARATUS

Filed Oct. 22, 1959

INVENTORS
WALTER STUMPF
HELMUT STURM
BY
Soans, Anderson, Luedeka & Fitch
ATTORNEYS July 6, 1965

W. STUMPF ETAL 3,193,136

COIL FEEDING APPARATUS

Filed Oct. 22, 1959

INVENTORS
WALTER STUMPF
HELMUT STURM
BY

ATTORNEYS

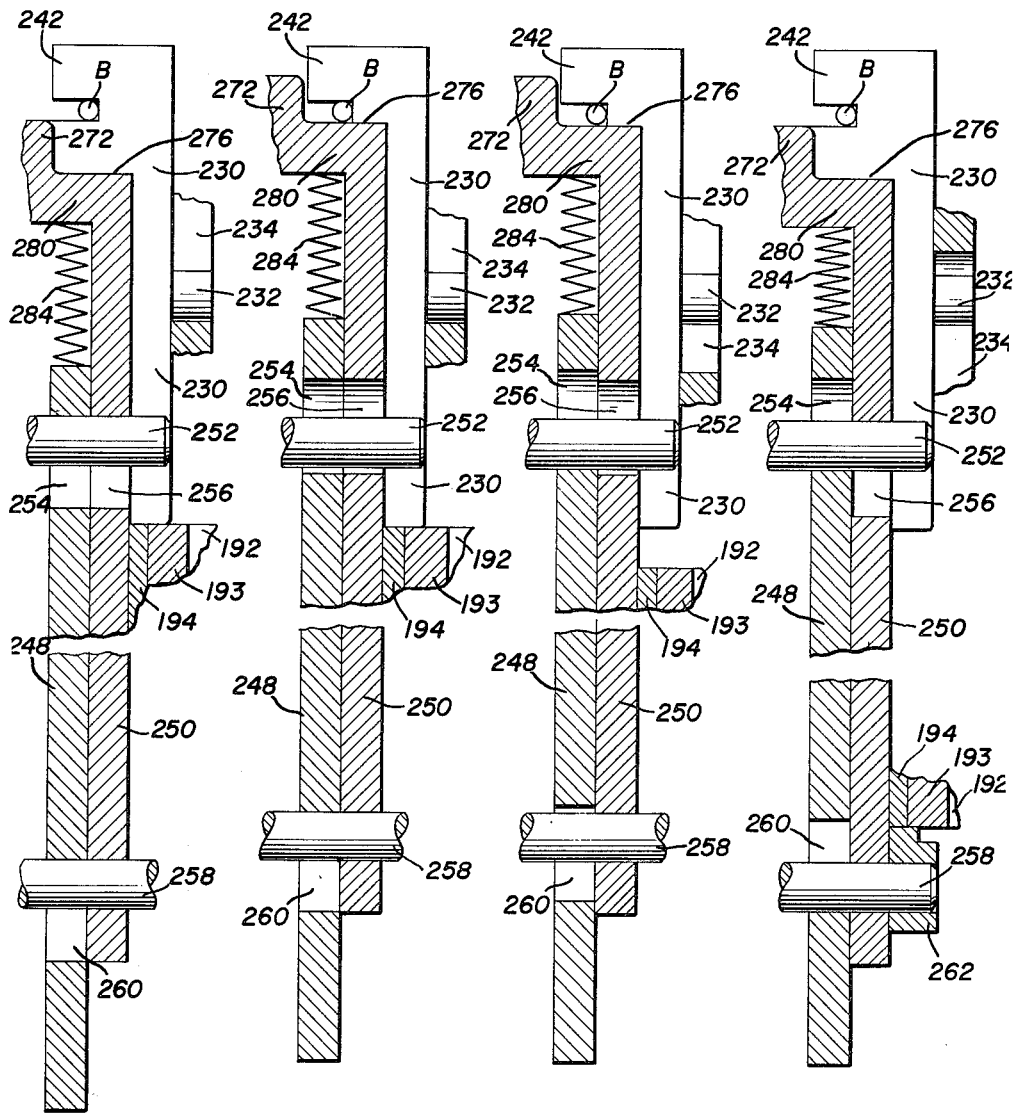

FIG. 21
FIG. 22
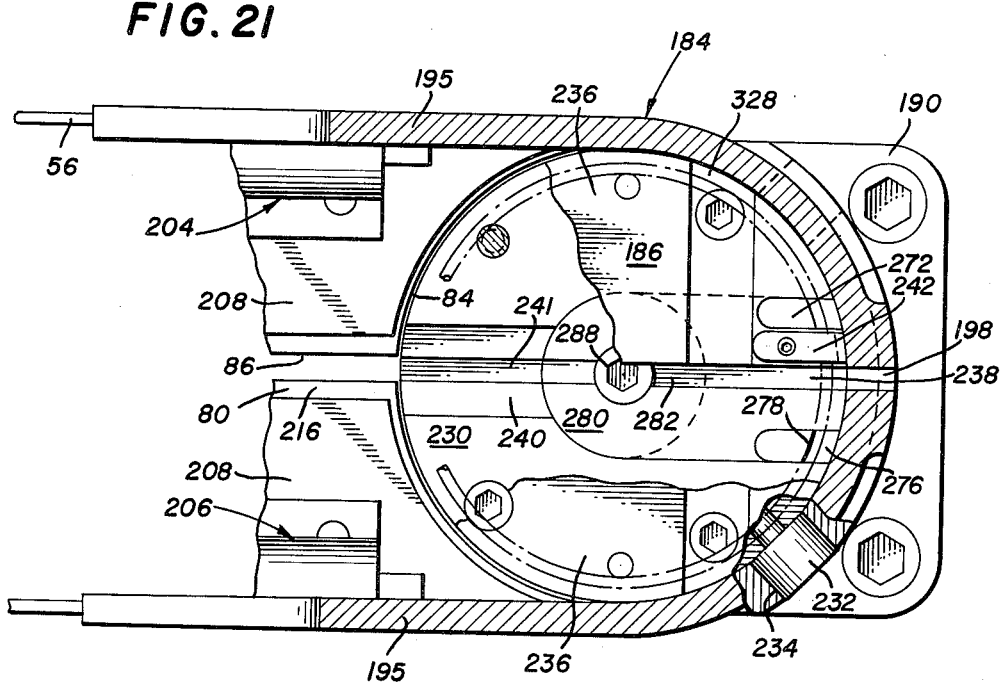
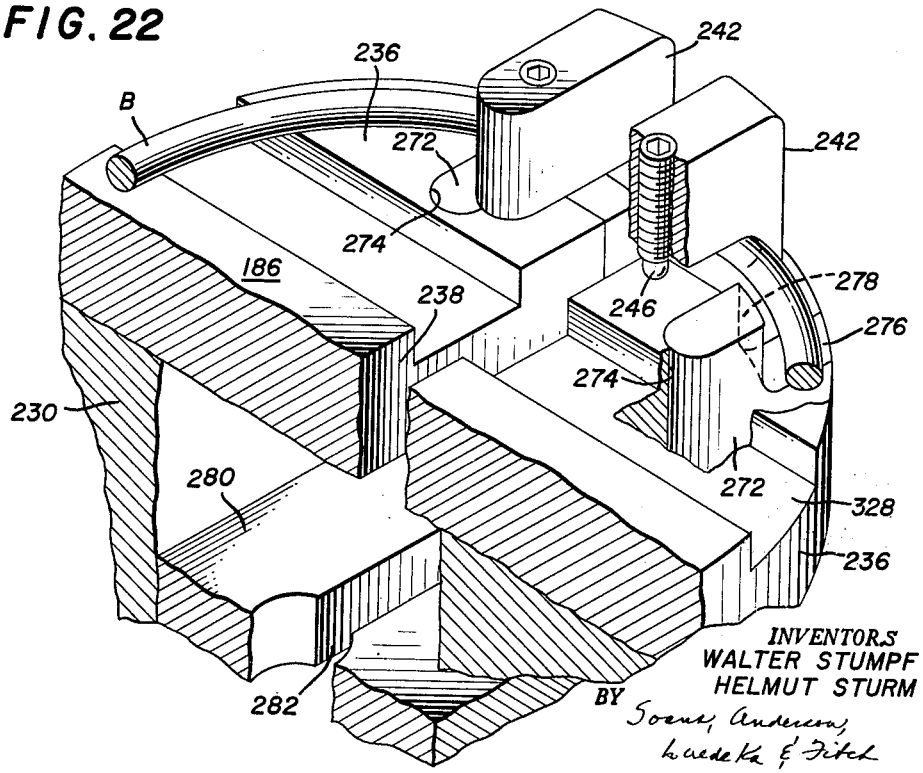
INVENTORS
WALTER STUMPF
HELMUT STURM
BY
ATTORNEYS July 6, 1965  W. STUMPF ETAL  3,193,136
COIL FEEDING APPARATUS Filed Oct. 22, 1959  17 Sheets-Sheet 12

INVENTORS
WALTER STUMPF
HELMUT STURM

ATTORNEYS

July 6, 1965

W. STUMPF ETAL 3,193,136

COIL FEEDING APPARATUS

Filed Oct. 22, 1959

INVENTORS
WALTER STUMPF
HELMUT STURM
BY
Soans, Anderson, Luedeka & Fitch
ATTORNEYS

INVENTORS
WALTER STUMPF
HELMUT STURM
BY
ATTORNEYS

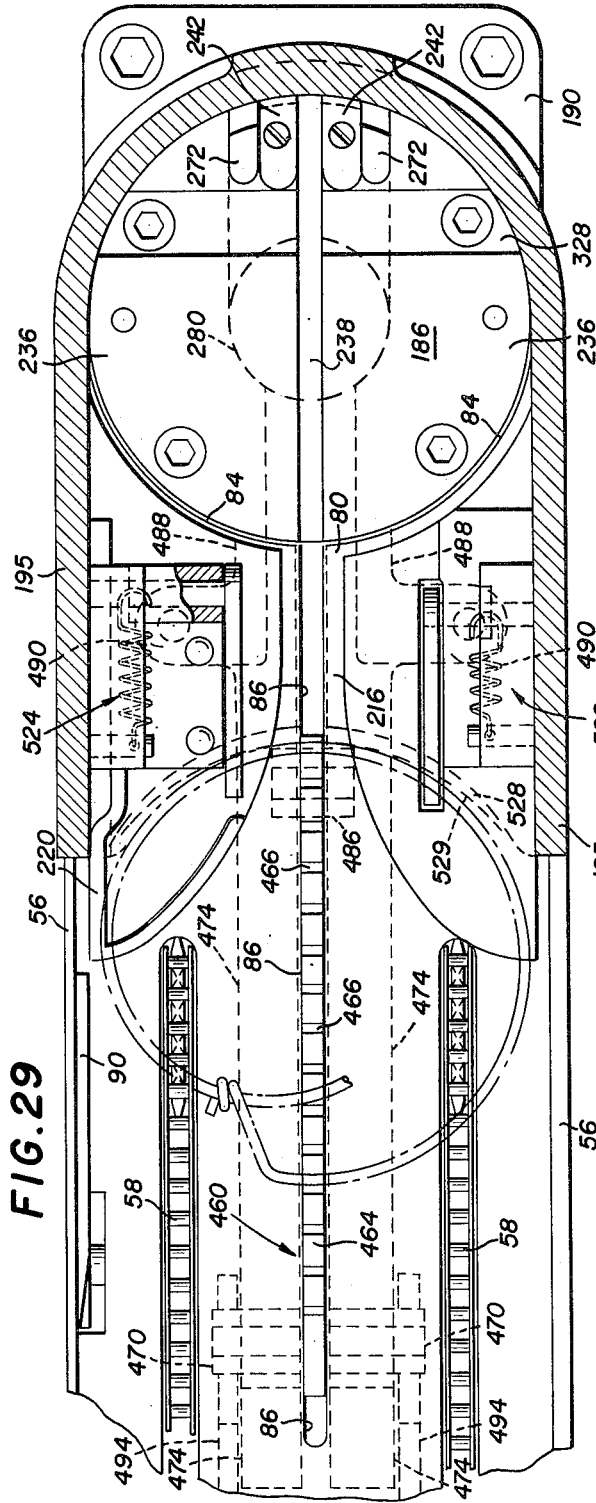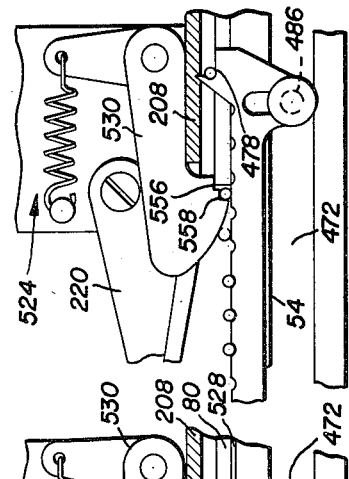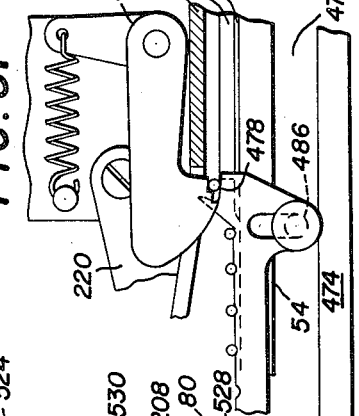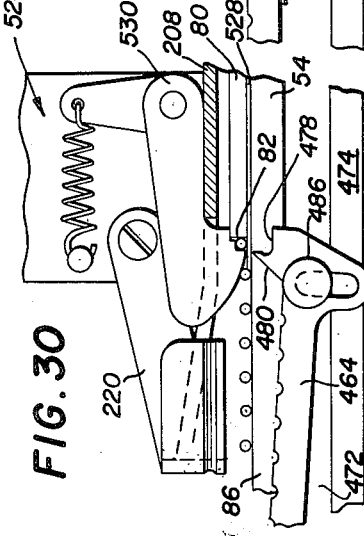
INVENTORS
WALTER STUMPF
HELMUT STURM
ATTORNEYS July 6, 1965 W. STUMPF ETAL 3,193,136
COIL FEEDING APPARATUS
Filed Oct. 22, 1959 17 Sheets-Sheet 17

INVENTORS
WALTER STUMPF
HELMUT STURM
BY
ATTORNEYS

United States Patent Office 3,193,136
Patented July 6, 1965

3,193,136
COIL FEEDING APPARATUS
Walter Stumpf and Helmut Sturm, Kenosha, Wis., assignors to Simmons Company, New York, N.Y., a corporation of Delaware
Filed Oct. 22, 1959, Ser. No. 847,932
18 Claims. (Cl. 221—40)

This invention is concerned with apparatus for making spring assemblies for use in mattresses, cushions or the like, and relates more particularly to apparatus for automatically supplying wire coil springs to a spring assembly machine, as for example, to a machine of the type disclosed in the United States Patent No. 2,388,106, issued to E. E. Woller.

In general, the primary object of the invention is the provision of a method and apparatus for automatically feeding coil springs to a machine adapted for assembling the coil springs into a spring construction. A further object of the invention is the provision of a method and apparatus for removing coils one by one from a nested stack of coil springs and feeding them, properly oriented, into an assembly machine.

A more specific object of the invention is the provision of a method and apparatus adapted for discriminating between the adjacent coil springs at the end of a stacked or interleaved series of coil springs and for separating the endmost coil spring from the series.

A still further specific object of the invention is the provision of apparatus for angularly displacing a coil spring for presentation, in proper orientation, to an assembly machine and for automatically anchoring the coil spring during its angular displacement.

An additional object of the invention is the provision of a control system which can be integrated with that of the associated coil spring assembly machine.

These and other objects and advantages of the invention will be understood from the following description and the accompanying drawings, in which:

FIGURE 5 is an enlarged fragmentary view of a part of FIGURE 3 showing portions of the mechanism in greater detail;

FIGURE 6 is a sectional view taken along line 6—6 of FIGURE 5;

FIGURE 7 is an enlarged perspective view of the left knot guide which appears also in FIGURES 3 to 6;

FIGURE 8 is a sectional view taken along line 8—8 of FIGURE 7;

FIGURE 9 is an enlarged perspective view of the right knot guide which also is shown in FIGURES 4 and 6;

FIGURE 10 is a sectional view taken along line 10—10 of FIGURE 9;

FIGURES 17 to 20 are schematic views of a portion of the mechanism shown in FIGURES 15 and 16, illustrating in sequence the steps of their operation in gripping and releasing the spring coil before, during, and after its orientation movement;

FIGURE 21 is a partially broken away sectional view taken along line 21—21 of FIGURE 15;

FIGURE 22 is a perspective view, partially broken away, showing the top face of the plunger which holds the coil during the orientation movement;

FIGURE 29 is a partially sectioned plan view taken along line 29—29 of FIGURE 28;

FIGURES 30 to 32 are fragmentary views showing, in sequence, the successive stages of operation of the second embodiment of the discriminator mechanism in removing a coil from the supply and delivering it to the transfer station for re-orientation;

GENERAL

Figure 1:
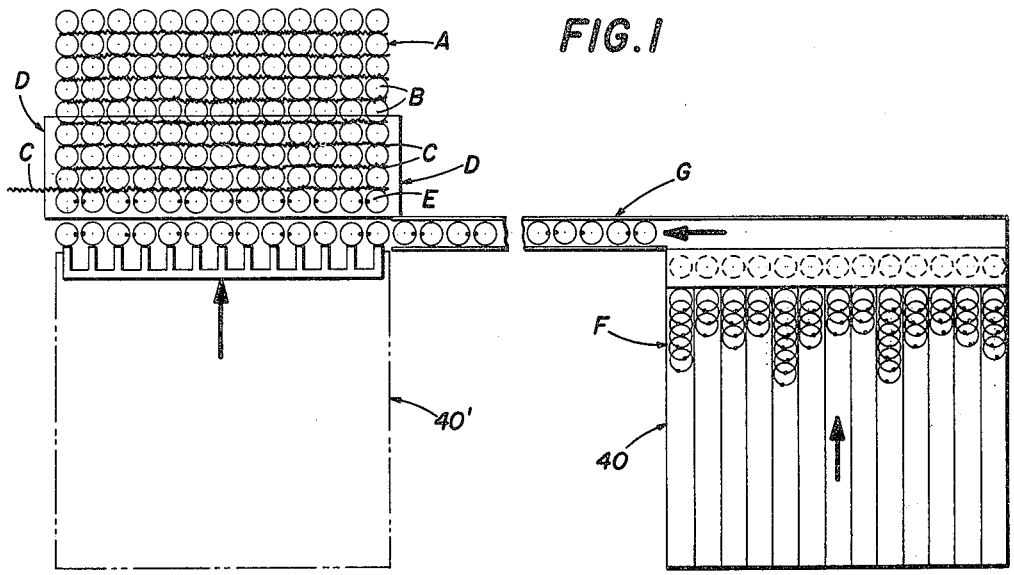
FIGURE 1 is a diagrammatic plan view showing alternative arrangements for the association of the coil feeding apparatus of the invention with a spring assembly machine.

Referring to FIGURE 1, the type of spring assembly A (or "construction," as it is commonly called in the trade) which is contemplated by this invention and by the assembly machine of the earlier mentioned Woller patent is generally rectangular, comprising a multiplicity of wire coil springs B which are connected together in rows, and to adjacent rows, by a series of generally parallel, helical tie wires C. The tie wires C extend transversely of the construction on both the upper and lower faces, being threaded by the assembly machine D about the juxtaposed portions of the uppermost and lowermost convolutions of the spring coils in adjacent rows. A typical spring construction in commercial use in the manufacture of mattresses comprises 312 coil springs arranged in 24 rows of 13 coils each.

The end convolutions of the individual wire spring coils, usually of the helical, double-cone, or hourglass type, are closed loops formed by wrapping the free ends of the spring wire in a tight knot E around the adjacent portion of the adjoining convolution. As it is evident that a helical tie wire C cannot be readily threaded around the knot E, it is important, when positioning the coil springs for assembly, that the knots be located so as not to interfere with threading of the transverse helical tie wires.

Accordingly, when the individual spring coils are presented for assembly, the knots of each coil, located in as nearly vertical alignment as manufacturing tolerances permit, are preferably displaced approximately one-quarter turn from the point of intended interconnection with the coils in the adjacent rows. Also, to compensate for the greater resistance of the individual coils to lateral shear in one direction, the coils in a given row are preferably turned so that the positions of the knots of adjacent coils are reversed, i.e., oriented as "rights" and "lefts" to balance the resistance of the construction to side sway.

The disclosed coil feeding apparatus 40, and the method employed in conjunction therewith, are designed to extract spring coils, one at a time, from nested stacks F of such coils, and to deliver them, either directly or through the medium of an intermediate conveyor G, at the proper time and in the proper orientation, to the assembly station of a spring assembly machine.

Figure 2:
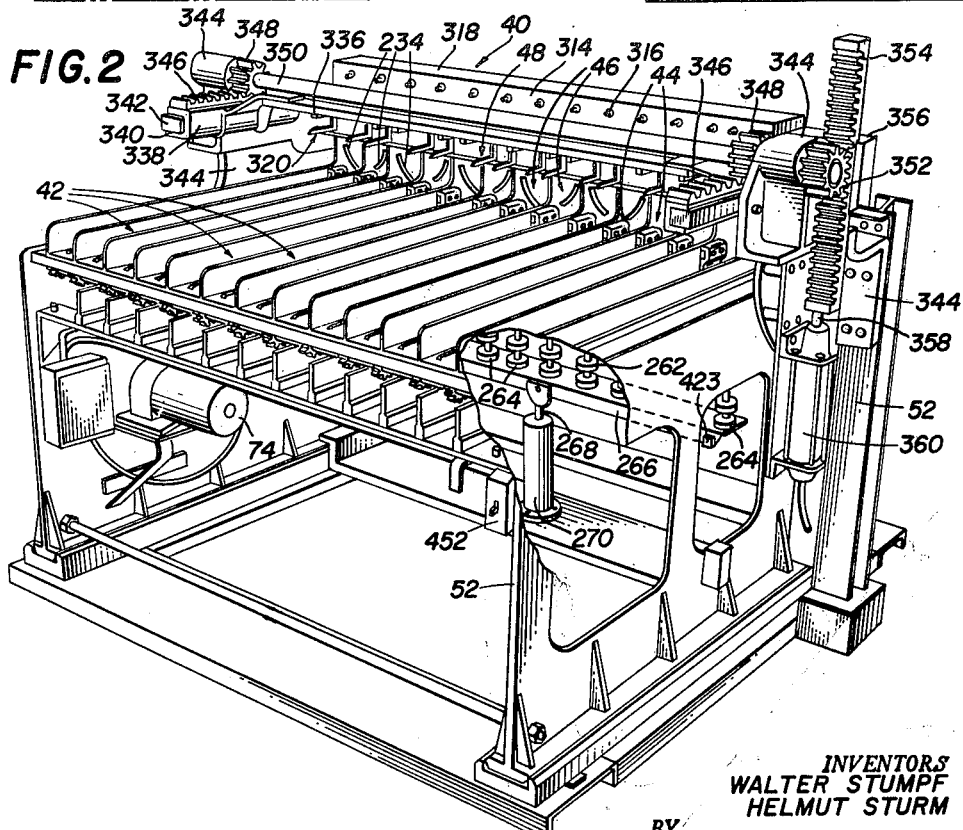
FIGURE 2 is a perspective view of coil feeding apparatus embodying the invention.

This is accomplished, in the apparatus of the invention, by mechanism which, as seen in FIGURE 2, is best initially described, in general terms and by way of its integrated functions, as including a magazine 42 for receiving a stack of coil springs which are interleaved or nested in a common orientation, and from which the coils are extracted individually by a discriminator mechanism 44 which delivers them to a transfer station 46.

At the transfer station, the coil spring is rotated, right or left as the case may be, for proper presentation to the assembly machine, and then ejected from the transfer station by an unloading mechanism 48 either directly into the assembly machine D, or into the conveyor G in which the orientation is preserved and from which the coil is subsequently ejected into the assembly machine.

Each of these operations is programmed in proper sequence by an automatic control system 50 (FIGURE 27) which is also related to the operational cycle of the assembly machine so as to feed the coils into the assembly machine at the proper time.

If it is desired to feed the coils directly into the assembly machine D, the coil feeding apparatus may be located immediately in front of the assembly machine, as indicated at 40' in dotted outline in FIGURE 1. However, to facilitate servicing of the assembly machine proper, the coil feeding apparatus 40 may be sidewardly offset from the assembly machine, as shown in full lines in FIGURE 1, to deliver the coils to a conveyor, such as is shown in the aforementioned Woller Patent No. 2,388,106, and from which, in turn, the coils are inserted into the assembly machine.

As the particular coil feeding apparatus illustrated in the drawings is intended for use with a spring assembly machine having a capacity of 13 coils in each transverse row, it comprises essentially 13 separate feeders which are generally identical (except for being left or right handed in order to deliver the coils with the knots located in the pattern shown in FIGURE 1), mounted on a common base frame 52, and operated in unison from power sources, and by a control system, common to all. Of course, the apparatus can also be operated to feed less than 13 coils per row by emptying selected magazines, as for example, when it is desired to make spring constructions of lesser width.

MAGAZINE

Each of the several magazines 42, all mounted parallel to one another on the base frame 52, is essentially an open-ended, flat-bottomed, horizontal trough comprising (see FIGURES 3 and 4) a floor plate 54 with side plates 56. The coil springs B, emplaced by hand in the magazine in interleaved or nested stacks with the knots E at the trailing edges of the coils, (FIGURE 3), are urged forwardly in the trough by a pair of endless roller chains 58, each of which is trained about a pair of spaced sprockets 60 and 62 with its upper run confined in a longitudinal groove 64 in the bottom plate. The depth of the groove is such that the upper edge of the chain extends sufficiently above the bottom plate (see FIGURE 3) to exert a steady, forward drag on the spring coils in the magazine.

The sprockets 60 at the front of the magazine are secured to a short shaft 66 journaled in a bearing 68 on the underside of the floor plate 54. Each shaft 66 is also provided with a gear (not shown) which meshes with one of a plurality of gears 70 secured to a shaft 72 which extends across the front of the base frame 52 beneath the bank of magazines 42 and is preferably driven by a variable speed electric drive indicated generally at 74 in FIGURE 2.

The sprockets 62 at the rear of each magazine are preferably journaled on short stub shafts or trunnions 76 each mounted in an individual bracket 78 likewise secured to the underside of the floor plate 54. This arrangement provides a clear space between the rear sprockets 62 for purposes to be later described.

At the rearward end of each magazine (FIGURES 3 to 6), the advancing movement of the coil springs is arrested by a flat stop plate 80 which is mounted on the upper surface of the floor plate 54 and has a concave edge 82 which is engaged by the lower convolution of the lead coil. As seen in FIGURES 4 and 6, the extreme rearward ends of both the floor plate 54 and stop plate 80 terminate in a semi-circular edge 84 at the transfer station 46. Both are also slotted centrally at 86 for reasons yet to be described.

Figure 14:
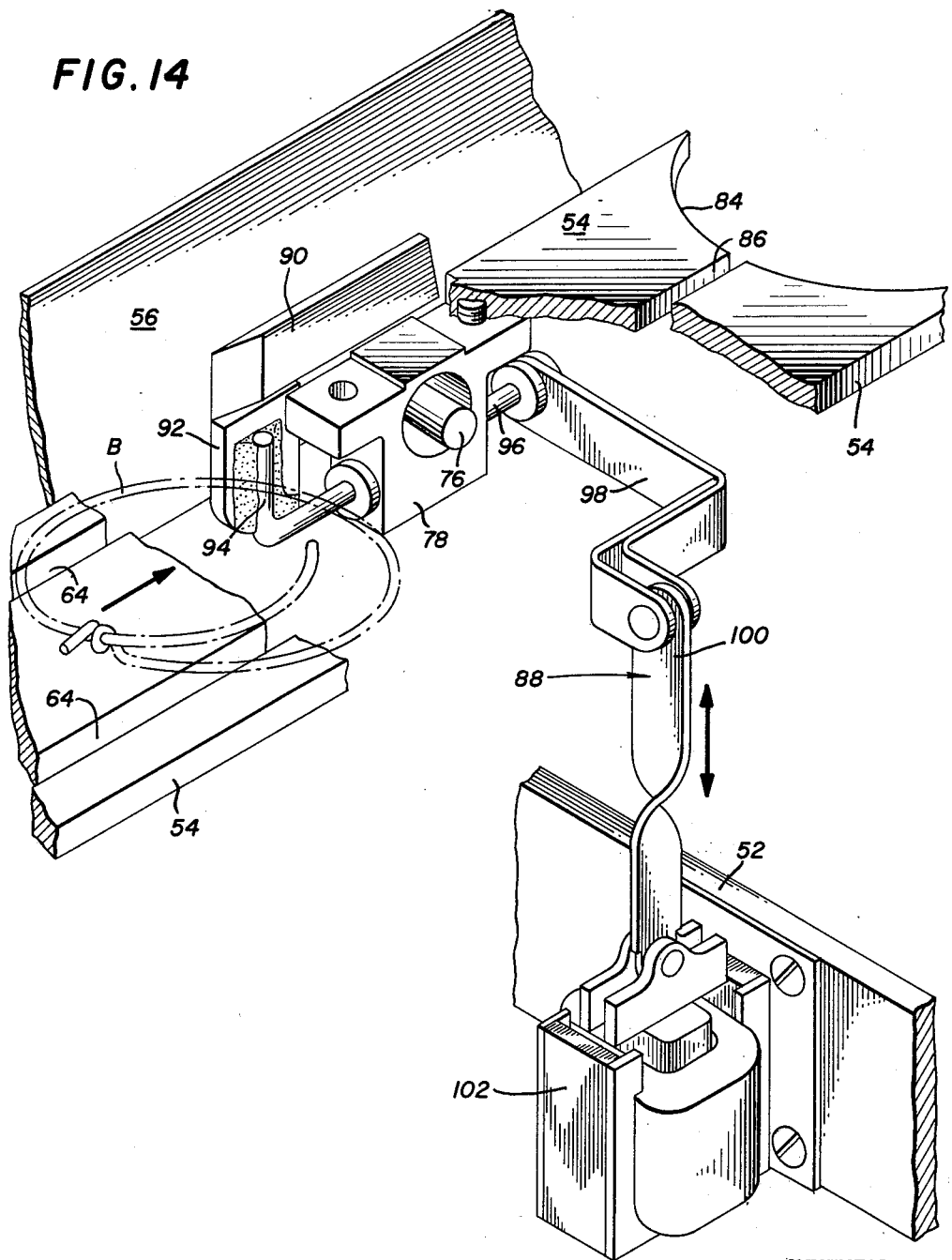
FIGURE 14 is an enlarged perspective view of a vibrator mechanism which may be employed to facilitate the coil separation action.

Associated with each of the magazines 42 is a shaker mechanism 88 (see especially FIGURES 5 and 14) which operates to vibrate the forwardmost coil springs to loosen their frictional contact with each other and facilitate their individual withdrawal from the magazine. The agitator comprises a paddle 90 which lies alongside one of the magazine side plates 56 and has a tapered leading end affording smooth initial contact with the coil springs as they advance in the magazine. A depending leg 92 of the paddle extends downwardly through the floor plate 54 to the underside of the magazine where it is welded to the bent end 94 of a shaft 96 journaled in the sprocket bracket 78. A bent arm 98, secured to the other end of the shaft 96 at its opposite end, is connected by means of a link 100 to the biased armature of a vibratory solenoid 102 mounted on the base frame 52 of the machine. As seen particularly in FIGURE 14, the rapid short stroke of the solenoid armature is transmitted through the link 100 to rock the arm 98, and with it the shaft 96, and ultimately the coil spring engaging paddle 90.

Discriminator mechanism

Figure 3:
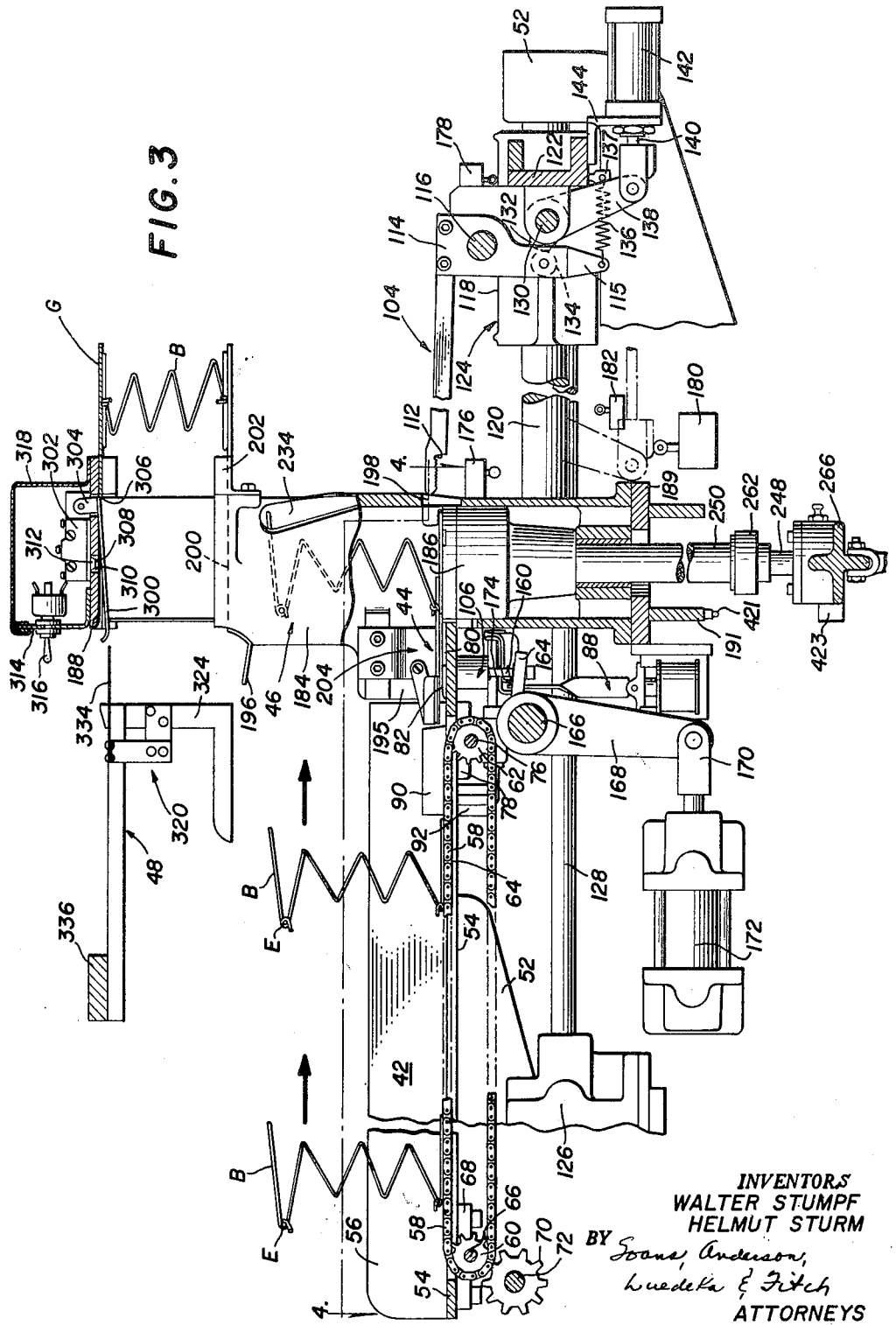
FIGURE 3 is an enlarged fragmentary side elevational view of one of the coil feeders of the apparatus shown in FIGURE 2, certain parts being broken away or shown in section to facilitate understanding.
Figure 4:
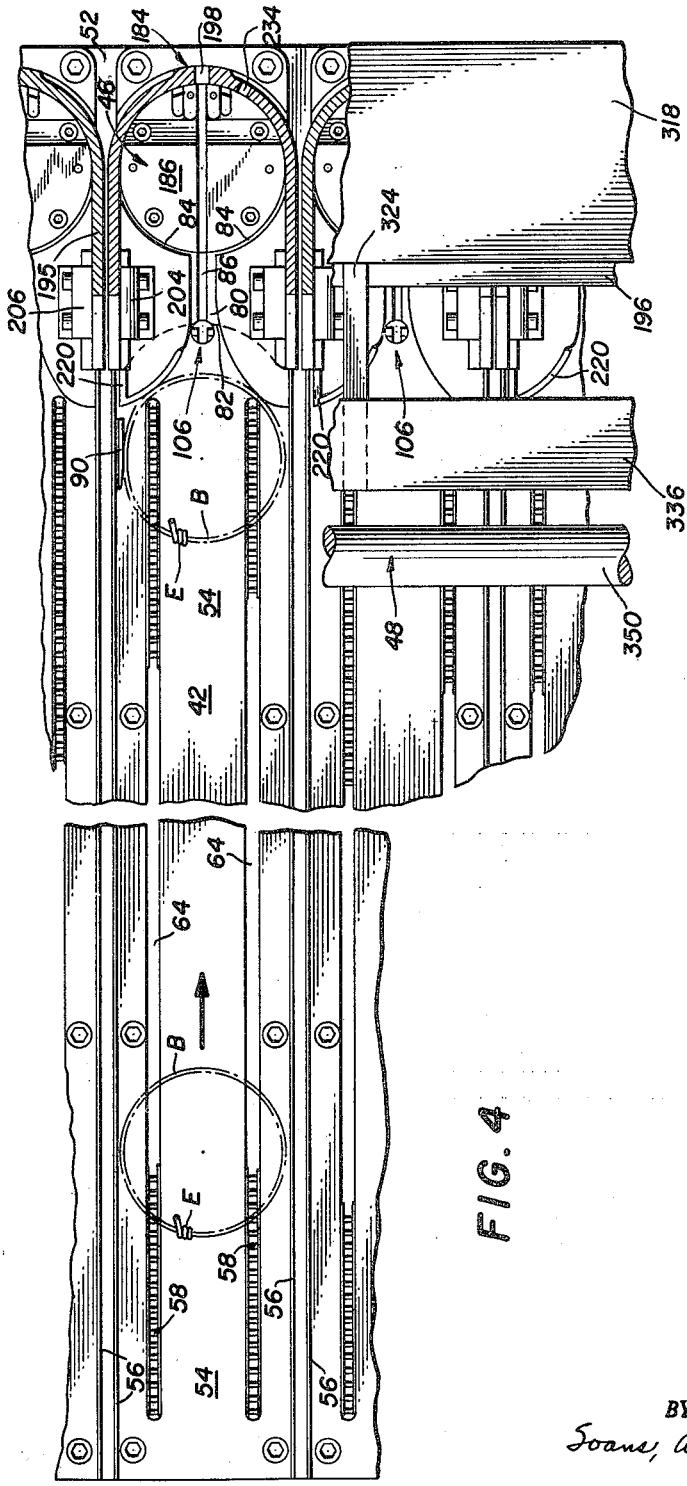
FIGURE 4 is a fragmentary plan view of the coil feeder of FIGURE 3, with selected parts shown in section along line 4—4 of FIGURE 3.

From the description thus far, it will be understood that a stack of coils, each with its knot on the trailing edge, is urged forwardly in the magazine by the roller chains 58, the edge 82 of the stop plate 80 acting as a limiting barrier at the end of the magazine (FIGURES 3, 5 and 6).

At that point, the lead coil is separated from the stack, and delivered into the transfer station 46, by the cooperative action of a picker finger 104 which advances toward the coil from the far side of the transfer station, and a coil lifter 106 which operates through a floor plate 54 of the magazine immediately in front of the stop plate 80. As will be explained in detail, the coil lifter 106 lifts the lead coil to the level of the upper surface of the stop plate 80, transferring the coil to the picker finger 104 and simultaneously acting as an intermediate temporary barrier to the second and subsequent coils as the picker finger is withdrawn to carry the lead coil into the transfer station.

The picker finger 104 (see especially FIGURE 5) is essentially a flat bar having an upwardly offset nose portion with a rounded tip 108 and a serrated underedge 110. At the base of the nose portion, the underedge is notched to form a hook 112 for grasping the lead coil, the sides of the notch being slightly divergent to facilitate grasping and releasing of the coil. Each picker finger is secured to the upper end of a rocker arm 114 which includes a pair of spaced downwardly depending legs 115 and which, together with like assemblies for each feeder, is journaled on a cross shaft 116 secured at its ends in slide brackets 118 mounted on arbors 120 at opposite sides of the main frame. The brackets at opposite sides of the frame are also joined by a heavy channel iron cross member 122 to constitute a rigid sub frame 124. The reciprocal movement of the ganged picker fingers into and out of the transfer stations is provided by a double acting air cylinder 126 (see FIGURE 3) mounted upon the base frame 52 beneath the magazines 42 and having its piston connected by means of an elongated connecting rod 128 to the heavy channel iron member 122 of the picker finger sub frame.

Rocking of the picker finger for the purpose of elevating its active part during advancing movement through the transfer housing and the subsequent lowering of the same to grasp the lead coil of the magazine, is accomplished by means of a cam shaft 130 journaled in the slide brackets and having a plurality of cams 132, each of which extends between the legs 115 of one of the rocker arms 114 to limit sidewise movement thereof on the cross shaft 116 and to engage a roller follower 134 carried between the legs 115 so as to lift the picker finger against the action of a tension spring 136 stretched between the legs 115 and an anchor stud 137 on the movable sub frame. Secured to the cam shaft to rock the cam humps into and out of engagement with the followers of the picker finger rocker arms is a crank arm 138, the outer end of which is pivotally connected, in a pin and slot connection, to a clevis at the end of the piston rod 140 of a small, double-acting auxiliary air cylinder 142 mounted on a bracket 144 secured to the cross member of the movable sub frame. As shown in FIGURE 3, the engagement of the cam humps with the follower rollers lifts the ends of the picker fingers, the arrangement of the parts there shown being that which exists at the beginning of the advancing stroke.

When the picker fingers complete their ingoing stroke, the cam-operating cylinder 142 is actuated to rock the cam humps out of engagement with their associated followers (see broken line position of piston rod and cam shaft arm in FIGURE 5) permitting the tension spring to pull the nose of the picker finger down for engagement with the coil.

From the foregoing description, it will be appreciated that while the lifting action of the picker fingers by the cams is direct and positive, the downward movement of the picker fingers depends upon the action of the tension springs. This arrangement is desirable to prevent damage to the picker finger and associated parts of the apparatus in the event that malfunction of any of the parts or improper positioning of a coil should tend to prevent downward grasping movement of the picker finger.

The coil lifter 106 (see FIGURES 3 and 5) comprises a cylindrical body 146 which is mounted for vertical sliding movement in a bearing 148 on the underside of the floor plate 54 of the magazine.

The lifter is restrained against rotation by means of a set screw 150 which passes through the bearing wall into a longitudinal slot milled in the body of the lifter.

At its upper end, the front face 152 of the lifter is milled flat to provide clearance with the partially overhanging stop plate 80, and to widen the area of contact with the bottom convolution of the lead coil. The top of the lifter is milled to provide a central slot 154 (see FIGURE 6) for the passage therethrough of the picker finger, the slot defining two upwardly projecting fingers 156 are sloped on their rearward sides and stepped on their forward sides to provide a seat 158 for engaging and lifting the leading edge of the bottom convolution of the lead coil when the latter is emplaced against the stop plate 80. The sloping rearward faces of the two fingers act as wedges to move the second coil rearwardly if necessary, and as a temporary barrier for the second coil when the lead coil is advanced by the picker finger.

As seen in FIGURES 3 and 5, threaded into the body of the coil lifter is a downwardly-extending, headed shank 160 which passes through a slot 162 in an arm 164 secured to a rocker shaft 166 extending crosswise of, and journaled at its ends in, the base frame 52 of the machine. Secured to the rocker shaft is a downwardly extending crank arm 168 pivoted by means of a pin-and-slot connection to the yoke or clevis 170 of the piston rod of a double acting air cylinder 172. Surrounding the shank of each coil lifter between the lifter body 146 and the arm 164 of the rocker shaft is a compression spring 174 which raises the lifter when the shaft is rocked counterclockwise by the cylinder 172. As was the case with the picker finger 104, the action stroke of the coil lifter 106 is spring biased to guard against the possibility of damage due to malfunction or an improperly placed coil, whereas the withdrawal stroke, powered by the interengagement of the arm 164 of the rocker shaft with the head of the coil lifter shank 160, is positive. It will also be appreciated that the limits of travel of the coil lifter are determined by the extent of movement of the arm of the rocker shaft, fine adjustments in the stroke of the individual coil lifters being facilitated by the threaded engagement of the shank 160 with the coil lifter body 146.

While the reciprocal movement of the picker fingers 104 through the transfer stations 46 for the transportation of the lead coils thereto is timed in relation to other major active portions of the apparatus, and also in relation to the operation of the assembly machine, by means which are still to be described, the control of the up-and-down grasping movement of the picker fingers 104 and the like movement of the coil lifter 106 is preferably controlled directly from the reciprocating movement of the picker fingers.

For control of the grasping movement of the picker fingers, two electrical switches 176 and 178 are provided and are connected to associated solenoids in the valve controlling the air cylinder 142 which rocks the cam shaft 130. During the retractive movement of the sub frame 124, upon which the picker fingers are mounted, the switch 178 is momentarily closed to valve the cylinder 142 so as to retract its piston, thereby causing the cam humps to be rocked against the followers 134 to lift the ends of the picker fingers. The switch 178 is operable only on the return stroke of the sub frame 142 so that when the cylinder valve is thereby positioned to retract the piston rod 140, it remains retracted until the valve is again shifted. Thus, once elevated, the ends of the picker fingers 104 remain elevated until the air pressure is reversed to rock the cam shaft in the opposite direction.

This occurs when the switch 176 is momentarily closed at or near the end of the ingoing movement of the picker fingers. When the switch 176 is actuated, pressure air is applied to effect extension of the piston rod of the air cylinder 142, as indicated by the broken line positions in FIGURES 3 and 5, whereupon the tension springs 136 pull the ends of the picker fingers down.

At the same time, as also indicated by the broken line positions in FIGURES 3 and 5, the extended connecting rod 140 of the air cylinder 142 actuates a third switch 180 which is associated with the air cylinder 172 operating the coil lifter, thereby causing extension of its piston rod to raise the coil lifter 106, as previously described. The nature of the switch 180 and of the valve mechanism controlling the air cylinder 172 are such that the coil lifter 106 is raised as long as the switch 180 remains closed, i.e., as long as the picker fingers is at the extreme inward end of its travel. When the picker fingers commences its withdrawal stroke, the connecting rod 140 of the air cylinder 142 is withdrawn from the operator of the switch 180, reversing the application of pressure in the coil lifter cylinder 172, thereby retracting the coil lifter.

The piston rod of the air cylinder 142 remains extended on the return stroke of the picker fingers, permitting the picker fingers to be held down on the lead coil until the switch 178 is operated to apply pressure in the reverse direction in the cylinder 142, thereby to cause the picker fingers to be rocked upwardly by the cam shaft. The actuation of the switch 178 preferably occurs just prior to the end of the withdrawal stroke of the picker fingers in order to release the lead coil when the latter is properly emplaced in the transfer station 46.

At this point, it is also convenient to note the switch mechanism for controlling the shaker mechanisms of the magazines. Referring still to FIGURES 3 and 5, it will be noticed that there is positioned in any suitable way on the base frame 52 of the machine a fourth switch 182 positioned to be actuated by the picker fingers sub frame 124 during the advancing stroke of the picker fingers. Thus, the vibrator mechanisms are put in operation by the approach of the picker fingers to facilitate the separation and withdrawal of the lead coils from the stacks of coils in the magazines.

The relationship of the aforementioned controlling switches to the overall control system will be taken up later in the description of the control system.

Figure 11:
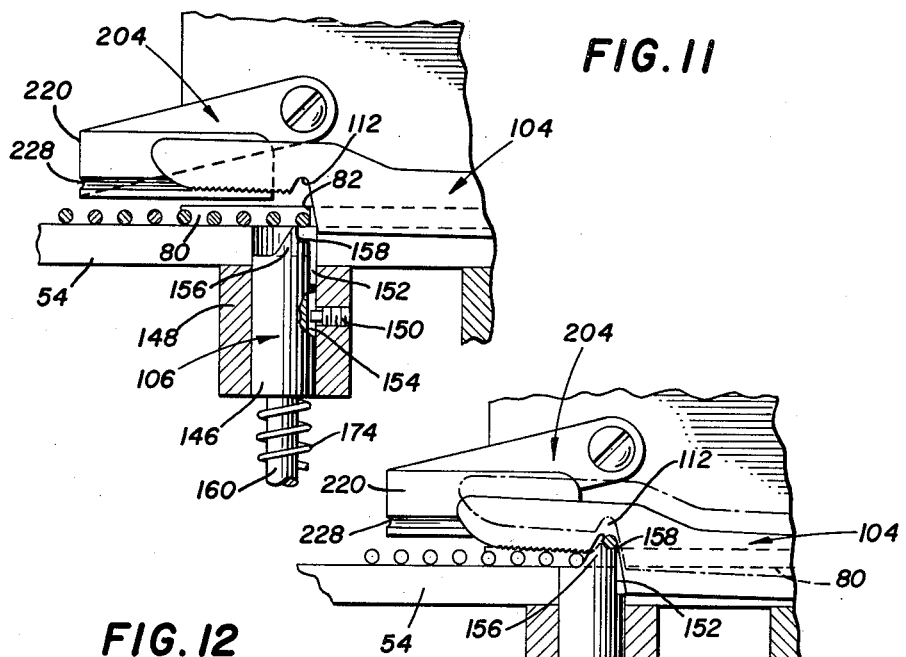
FIGURES 11 to 13 are enlarged fragmentary views of mechanism shown in FIGURE 5, illustrating, in steps, the cooperation of certain parts in separating the end coil from the interleaved stack of coils.
Figure 12:
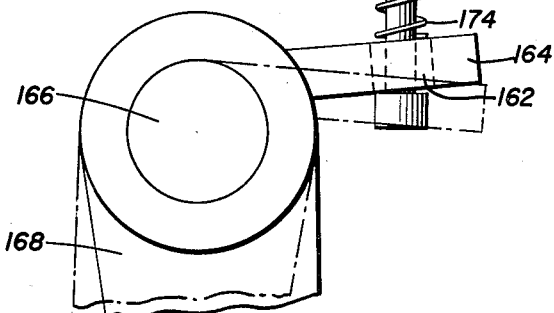
Figure 13:
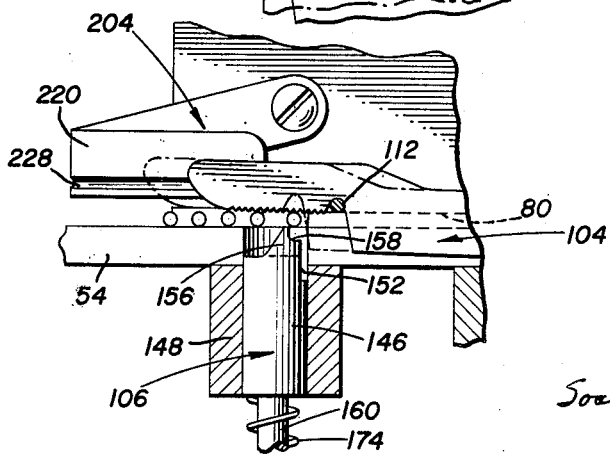

The cooperative action of the picker fingers 104 and the coil lifters 106 is shown in sequence in FIGURES 11 to 13 inclusive. In FIGURE 11, the respective parts are shown immediately at the end of the inward stroke of the picker fingers with the grasping notch of the same disposed immediately above the leading edge of the lead coil in the magazine, the latter being emplaced against the stop plate 80. FIGURE 12 shows the position of the parts after the air cylinder 142 has been actuated to permit the lowering of the end of the picker fingers by the tension spring 136, and after the air cylinder 172 has been actuated to elevate the coil lifter, the two actions taking place substantially simultaneously, with the result that the leading edge of the lead coil is lifted into the notch 112 of the picker fingers as the latter moves down. As seen in FIGURE 12, the lead coil has been elevated to the level of the top surface of the stop plate 80 and the bottom convolution of the second coil is seated against the back slope of the coil lifter fingers 156, its stop edge being engaged by the serrations 110 on the underedge of the picker fingers.

FIGURE 13 shows the respective positions of the parts shortly after the commencement of the withdrawal stroke, i.e., when the withdrawal stroke has proceeded sufficiently to open the switch 180 which controls the coil lifter cylinder 172. Thus, in FIGURE 13, the coil lifter 106 has again receded below the floor plate 54 of the magazine and the engagement of the serrated edge 110 of the picker finger with the second and subsequent coils in the stack has caused them to move forwardly to emplace the second coil against the stop plate 80 while the lead coil is being pulled across the top surface of the stop plate and into the transfer station 46.

*Transfer station*

As earlier noted, the transfer station 46 of each coil feeder recives the lead coil withdrawn from the magazine 42 by the picker finger 104 and rotates the coil a quarter turn, right or left, to locate the knots properly for subsequent delivery of the coil to the assembly machine. In addition, the coil is slightly compressed in the transfer station to facilitate its insertion into the pockets of the conveyor or into the assembly machine, and to preserve its selective orientation by frictional contact of its top and bottom convolutions with the pockets of the conveyor or with the jaws of the assembly machine, as the case may be.

Each transfer station comprises essentially an upright barrel or housing 184 having an opening on the side toward the magazine 42 to permit the entry of the lead coil. A plunger 186, reciprocable between a lower position at which it receives the coil and an upper position from which the coil, rotated a quarter turn during reciprocation, is ejected and a top plate 188 (FIG. 3) against which the coil is slightly compressed by the plunger 186, the plunger being maintained at the upper position to keep the coil under compression during its ejection in a horizontal movement from the transfer station.

The lower part of the housing barrel is cylindrical and is provided with a bolting flange 190 by means of which the barrel is secured in upright position to a cross member 189 which forms a part of the base frame 52 and which is stiffened by spaced vertical bars 191 (FIGURES 3 and 5). Cast integrally with the housing at its lower end are several webs 192 which merge to form a hub 193 supporting a central bearing 194 guiding the reciprocating movement of the plunger.

The walls of the upper, coil-receiving part of the housing 184 follow the same cylindrical outline in the rearward half of the housing but extend tangentially forward as straight side walls 195 (FIG. 6) to meet the side plates 56 of the magazine 42 and to provide a front opening or mouth through which the coil may pass into the housing. As indicated in FIGURE 3, the top of the coil-admitting opening at the front of the housing is preferably provided with a bill 196 which guides the upper convolution of an occasional higher-than-average coil on its passage into the housing. A short vertical slot 198 in the center of the rear wall of the upper coil-receiving portion of the housing at about the lower lever of the plunger therein provides access for the through passage of the picker finger 104.

At the extreme upper end of the housing, its walls are again circumferentially continuous (FIGURE 23) and are machined to provide, together with the coil plunger 186 in the elevated position, a bed 200 from which the re-oriented coil is ejected. The side walls of the housing extend slightly upwardly above the level of the bed to guide the coil in the ejection movement, the bed being extended on its rear side by a short, channel-shaped lip 202 of sheet metal or the like, which is bolted to the housing and, as illustrated in FIGURE 3, spans the gap between the housing 184 and the adjacent coil box of the conveyor G.

As indicated in FIGURE 1, the knots of the nested coils in the magazine 42 are disposed on the trailing sides of the coils, but not necessarily in precise axial alignment. Therefore, in order to place each coil uniformly into the transfer station 46 in predetermined orientation, the knot of the lead coil is aligned with the center line of the magazine by left and right knot guides 204 and 206 (FIG. 6), as an incident to its travel across the top of the stop plate 80 from the magazine into the transfer station.

Each knot guide comprises essentially a plate or blade 208 which projects inwardly at the mouth of the housing from one of the side walls 195 and into the path of the advancing coils. As shown particularly in FIGURES 7 and 9, the blades 208 are secured to brackets 210 attached by means of screws or the like on ways 212 cast integrally with the side walls 195 of the transfer housing. As shown particularly in FIGURES 5, 8 and 10, the blades are spaced sufficiently above the stop plate 80 to permit free passage of the lower convolution of the coil between the guide blades 208 and the stop plate 80 but not sufficiently to admit the knot E.

Furthermore, referring particularly to the plan view of FIGURE 6, the front edges 214 of the guide blades are curved so that when they are struck by an improperly aligned knot during passage of the lead coil into the transfer station, they guide the knot into the narrow central channel 216 between the two guide blades 208.

To facilitate the entry of the leading edges of the lower convolutions of the coils into the space between the blades 208 of the knot guides and the floor plate 54 of the magazine, the tips 218 of the blades are preferably upturned slightly and tapered on their edges as shown in FIGURES 8 and 10.

Furthermore, referring to FIGURE 6, it will be seen that the spring wire rises from the knot in a counterclockwise turn so that the blade 208 of the right hand knot guide 206, when it overlies the bottom convolution, is closely interleaved between the two lowermost convolutions. Thus, if a coil should be advanced toward the stop plate 80 with its knot disposed to the right of the magazine center line, the lower knot, or the short arm of the lower convolution of the coil adjacent to the knot, strikes the curved edge of the right hand guide blade and is cammed toward the magazine center line on its advancing movement for passage through the channel 216 into the transfer housing 184.

By the same token, the guide blade alone of the left knot guide 204 cannot be as effective to realign a coil whose knot is disposed to the left of center due to the direction in which the coil is wound. As can be observed from the drawings, the second convolution rises from the knot in a direction away from the guide blade 208 of the left knot guide, thus permitting no effective interleaving action of the left guide blade with the lowermost convolutions of the coil. Therefore, in order to provide a positive barrier against jamming beneath the left guide blade of a knot disposed to the left of the magazine center line, the left knot guide 204 is additionally provided with a pivoted keeper 220. The keeper consists of a forwardly extending arm 222 which is pivoted on a horizontal axis to the mounting bracket 210 of the left knot guide by means of a screw, and has at its end, a sidewardly projecting arm 224 which stands in front of the blade of the left knot guide, and is curved to conform generally to the leading edge of the blade. The keeper is positioned with the bottom edge of its curved arm spaced above the floor plate of the magazine and above the stop plate 80, with all of its front face disposed below the level of the pivot axis by engagement of the underside of the arm 222 with a notched segment of the blade 208, indicated at 226 in FIGURE 7. Additionally, the face of the keeper is grooved at 228, above its bottom edge, to facilitate its engagement with the wire end extending from the knot of the coil.

Thus, when a coil advances to the stop plate 80 with its knot to the left of the center line of the magazine, the knot is positioned to strike the front face of the keeper when that coil is subsequently advanced into the transfer housing by the picker finger. The pressure of the knot against the keeper, being directed forwardly in a line which passes beneath the pivot of the keeper, holds the keeper down tightly so that the knot is scraped sidewardly by the front face of the keeper to rotate the coil, thereby positioning the knot along the center line of the magazine. The groove in the face of the keeper is positioned to be engaged by the stub end of the spring wire at the knot and improves the contact between the keeper and the knot.

Figure 15:
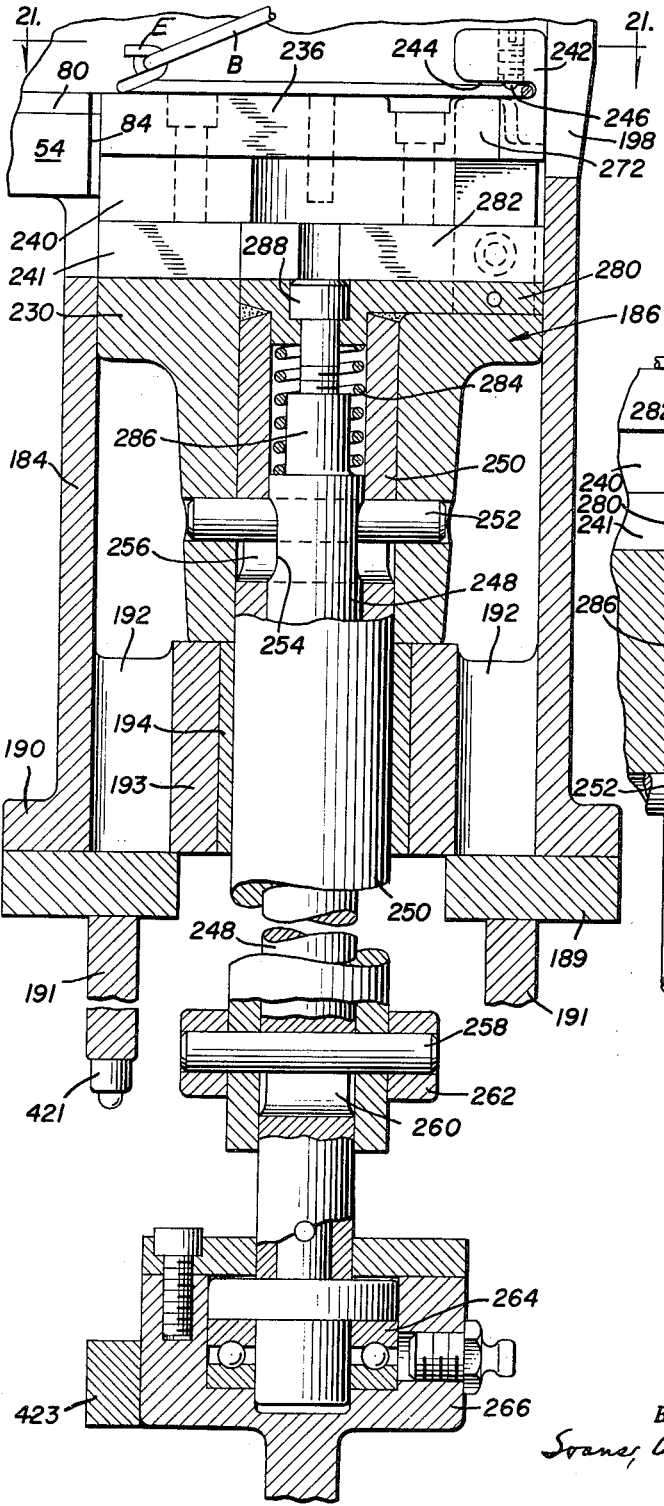
FIGURE 15 is an enlarged fragmentary view of mechanism shown in FIGURES 3 and 5, partially broken away to show the cooperation of the related parts which comprise the transfer station for orienting the coils for presentation to the assembly machine. The respective parts are shown at rest immediately after receipt of a coil from the supply stack.
Figure 16:
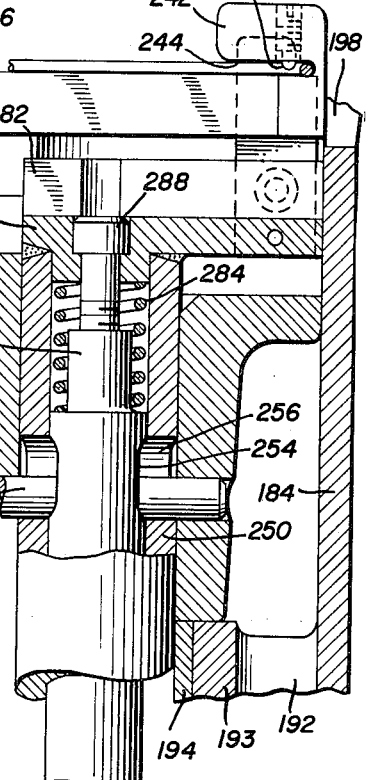
FIGURE 16 is a view similar to FIGURE 15 illustrating a changed position of the same parts for clamping the coil at the beginning of the orientation movement.

As seen particularly in FIGURES 15 and 16, each plunger 186 comprises a cylindrical body 230 having a loose sliding fit with the cylindrical walls of the housing 184. The plunger body 230 is provided with a sidewardly projecting stud or follower 232 (FIGURE 21) which is confined within a helical slot 234 in the wall of the housing (FIGURES 2, 3 and 5) to rotate the plunger a quarter turn as an incident to its vertical movement. The plunger body 230 is also capped with a pair of semi-circular face plates 236 (FIGURES 21 and 22) which are secured to the plunger body, as by the illustrated dowel pins and screws, to provide in the face of the plunger a central slot 238 aligned with the slot 86 in the end of the magazine. The purpose of the slot 238 in the face of the plunger, as with the slot 86 in the end of the magazine, is to provide clearance for the passage therethrough of the picker finger 104 which loads the lead coil into the transfer station 46.

Under the slot 238 between the face plates, the plunger body 230 is formed to accommodate operation of an alternative discriminator mechanism embodiment, still to be described, by the inclusion of a stepped recess including a radially extending channel 240 having a central groove 241 in the channel floor.

The movement of the coil springs into the housing 184 of the transfer station is arrested by a pair of upstanding retainers 242, one on each of the face plates 236, flanking the end of the central slot 238. The retainers are generally L-shaped, being undercut to form a notch 244 for receiving and containing the leading edge of the lower convolution of the coil emplaced therein by the picker finger 104. A spring-biased ball 246 extending downwardly into the notch from the undercut surface of each retainer permits entry of the spring wire under the driving force of the picker finger but prevents the coil from bounding out of the retainers in the event that the lowermost coil convolution is flexed by delayed release of the picker finger.

The vertical driving movement of the plunger 186 and the locking of the spring coil to the face of the plunger on its upward stroke are provided by a vertical drive rod 248 slidably interfitted concentrically within an outer sleeve 250 which, in turn, is journaled in the bearing 194 at the bottom of the housing. The outer sleeve 250 is also slidably fitted in the plunger body 230, and together with the drive rod 248, is connected to the plunger body by means of a single cross pin 252 which is fixed in the plunger body 230 and passes through alignable slots 254 and 256 in the drive rod and in the sleeve, respectively.

At their lower ends, the drive rod 248 and the surrounding sleeve 250 are connected by a second cross pin 258 which is secured in the outer sleeve 250 and passes through a slot 260 in the drive rod, the lower slot having the same length as the upper slots 254 and 256. The lower pin 258 also serves to attach a stop collar 262 to the outer sleeve for a purpose yet to be described.

The extreme lower end of the drive rod is received in a roller thrust bearing 264 which is ganged, together with like bearings for each of the 13 plungers, on a cross beam 266 connected to the normally retracted piston rod 268 of a double acting air cylinder 270 (see FIGURE 2). Thus, when the piston rod of the driving cylinder 270 is extended, the drive rod 248 is raised to engage the upper pin 252 to lift the plunger body 230, the assembly of plunger body 230, drive rod 248 and sleeve 250 being rotated as it rises.

At the beginning of the upward stroke of the plunger 186, the coil is locked to the face of the plunger and remains so locked throughout the upward movement to prevent relative rotation between the coil and plunger due to inertia or otherwise. At the top of the plunger stroke, the coil is released to permit its ejection from the housing.

The locking and unlocking of the coil is accomplished by cooperation with the retainers 242 of a pair of locking jaws 272 which are normally recessed in the face of the plunger body. As seen particularly in FIGURE 21 and 22, the locking jaws 272 are disposed in flanking relation to the retainers 242. They are normally retracted in notches 274 in the face plates so as to be flush with the surfaces thereof, but are extensible through the notches to engage the spring coil held in the retainers. The upper end of each jaw is stepped to provide a horizontal engaging surface 276, and a vertical wall 278 which conforms generally to the circular contour of the lowermost convolution of the coil. When the jaws are projected upwardly from the surface of the face plates 236, the horizontal surfaces 276 of the jaws engage the undersurface of the lowermost convolution to clamp it against the undercut surfaces of the retainers 242.

As better seen in FIGURES 15 and 16, the clamping jaws are secured to a head 280 which is fixed to the top of the sleeve 250 surrounding the drive rod 248 and which is slotted, at 282, to provide a continuation of the groove 241 in the plunger body. The head 280 and sleeve 250 are biased upwardly relative to the drive rod 248 by a compression spring 284 which surrounds a hub 286 of reduced diameter at the upper end of the drive rod. A cap screw 288 seated in the head 280 and screwed into the end of the drive rod 248 is drawn up to place the spring 284 under compression, the spring tending to maintain the relationship of the drive rod 248 and surrounding sleeve 250, as shown in FIGURE 15, i.e., with the lower pin 258 tight against the upper end of the slot 260 in the drive rod. When the parts are in the positions shown in FIGURE 15, i.e., with the drive rod 248 hanging from the upper pin 252 fixed in the plunger body 230 and with the action of the compression spring 284 restrained by the engagement of the lower pin 258 with the upper end of the slot 260 in the drive rod, the clamping jaws 272 are flush with the top surface of the plunger face plates 236.

The clamping and releasing movement of the jaws 272 relative to the plunger body 230 at the beginning and the end of the upward stroke of the plunger is best understood from the sequence of diagrammatic illustrations in FIGURES 17 to 20 inclusive. These should be compared for general reference with FIGURE 15 which shows the idle position of the parts immediately upon receipt of a coil, and with FIGURE 16 which shows the coil clamped to the retainers 242 by the jaws 272 at the beginning of the upstroke.

In FIGURES 15 and 17, the plunger body 230 rests on the hub 193 and the drive rod 248 is fully lowered with the top of its upper slot 254 resting upon the upper pin 252 fixed in the plunger body. At the same time, the top of its lower slot 260 is engaged with the lower pin 258 in the outer sleeve 250 holding the clamping head 280 down and the jaws 272 retracted in the plunger body 230.

As the drive rod 248 rises, the outer sleeve 250 and clamping jaws 272 rise with it, being lifted by the spring 284 until the clamping jaws engage the bottom convolution of the spring to arrest the movement of the outer sleeve. This occurs just prior to the taking up of the slack between the upper pin 252 and the slot 254 in the drive rod so that as the drive rod continues upwardly to firmly seat the upper pin in the bottom of its slot, the spring is further compressed to tighten the engagement of the clamping jaws 272 with the bottom convolution of the coil and to securely clamp the same against rotation during the upward movement of the plunger 186. The positions of the parts at the time of contact between the clamping jaws and the spring coil is shown diagrammatically in FIGURE 18. The immediately subsequent position of the parts, i.e., when the bottom of the slot 254 in the drive rod is firmly seated, incident to continued upward drive rod movement, against the pin 252 fixed in the plunger body, is shown diagrammatically in FIGURE 19, the relative movement of the parts being somewhat exaggerated for clarity.

As the plunger body 230 nears the top of its stroke, the stop collar 262 on the sleeve strikes the bottom of the hub 193 to arrest the upward movement of the sleeve 250 and of the clamping jaws 272. However, the drive rod 248 and plunger body 230 continue briefly upwardly, this further upward movement being permitted by the slot 256 in the sleeve encompassing the upper pin 252, and by the lower slot 260 in the drive rod encompassing the lower pin 258. This additional upward movement of the plunger serves to retract the clamping jaws 272 into the face of the plunger at the top of the stroke, and also further compresses the spring 284 to cushion the final stopping engagement of the lower end of the lower drive rod slot 260 with the lower pin.

When fully elevated, as earlier explained, the plunger 186, together with the top surface of the housing, constitutes the bed 200 (see FIGURE 23) from which the coil spring B is delivered by the unloading mechanism 48 to the pockets of the conveyor G or directly to the assembly machine. After the ejection of the coil, the piston rod 268 is again retracted into the cylinder 270 and the plungers 186 are lowered to the receiving position in readiness for the next cycle, as seen in FIGURE 15.

Figure 25:
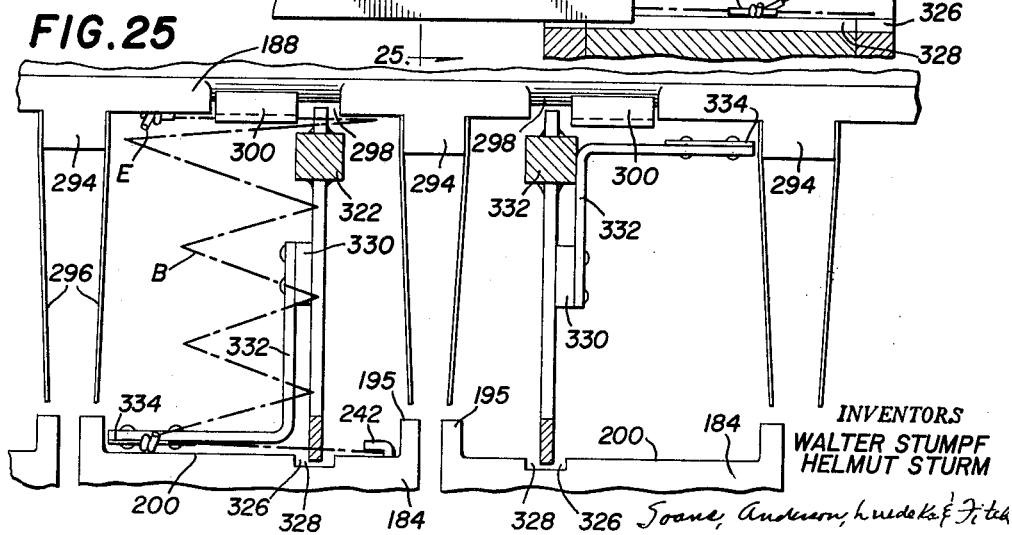
FIGURE 25 is a sectional view of the coil pusher mechanism, taken as along line 25—25 of FIGURE 24, showing the reversed arrangement of pusher blades for adjacent, oppositely oriented coils.

The top plate 188, seen best in FIGURES 3 and 25, overlies the entire bank of plunger housings, being supported at its ends in any convenient way by the base frame 52 of the machine. It is provided at intervals with downwardly extending bosses 294, each aligned with the upwardly extending side walls 195 of adjacent transfer station housings 184 (FIGURE 25), and each provided with a pair of downwardly extending blades 296 of sheet metal or the like which, together with the top plate and the upper surfaces of the transfer housings, define a cell for the coil at the upper end of the housing. If desired, one of the blades 296 at each cell can be curved to help enclose the cell. In between the bosses 294, the underside of the top plate 188 is provided with a wide groove 298 which houses the operating leaf 300 of an inspector switch 302 on the top side of the top plate. The operating leaf 300 of the switch is pivoted to the switch body by means of an arm 204 (see FIGURE 3) extending upwardly through a hole 306 in the top plate. Midway of its length there is secured to the operating leaf a button or stud 308 which extends upwardly into a hole 310 in the top plate 188. Immediately above the stud on the operating leaf 300 and extending downwardly into the hole 310 from above, is the operating button 312 of the inspector switch 302. Thus, when the inspector leaf 300 is lifted by the reception of a coil into the ejection cell, the inspection switch 302 is actuated for control purposes to be later described.

An angle plate 314 secured to the front of the top plate 188 serves as a mounting for a toggle switch 316 which, as later explained, is connected electrically to bypass the inspector switch 302. The entire bank of switches along the top of the top plate is protected by a sheet metal cover 318.

*Unloading mechanism*

Figure 23:
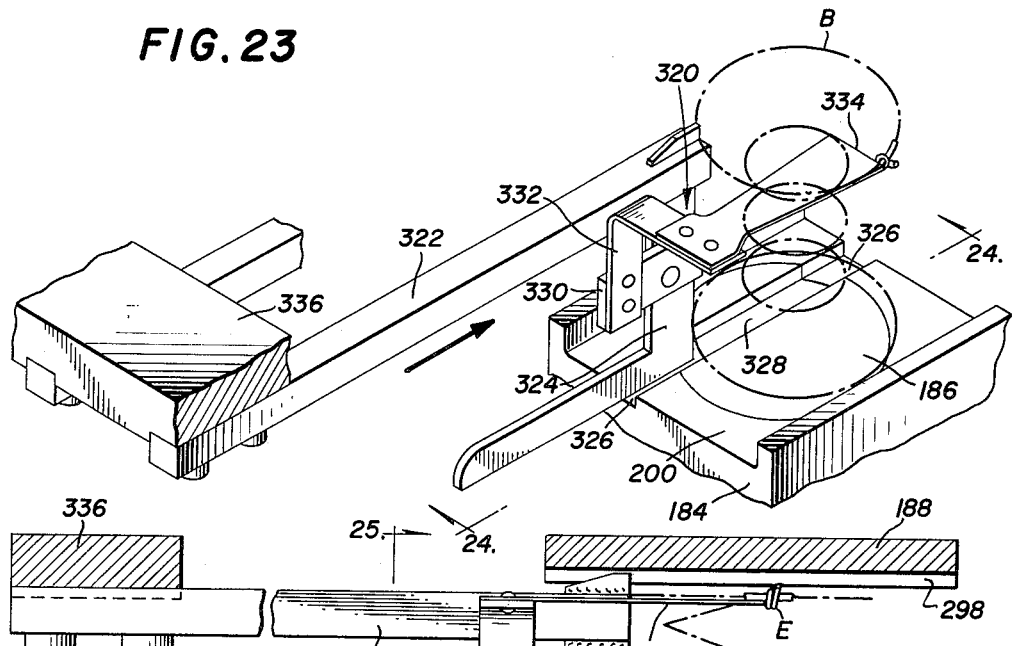
FIGURE 23 is a perspective view of a portion of the pusher mechanism which ejects the coil, properly oriented, from the feeding apparatus.
Figure 24:
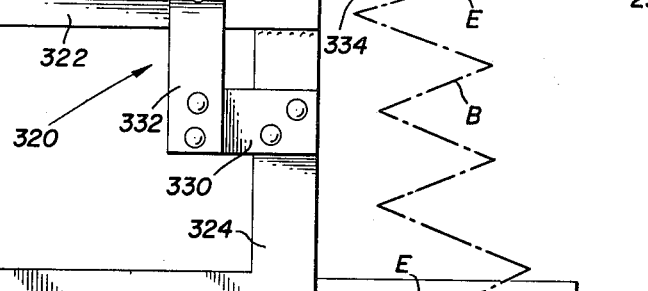
FIGURE 24 is a view taken along line 24—24 of FIGURE 23.

The unloading mechanism, shown in detail in FIGURES 23, 24 and 25, ejects the re-oriented coil springs from the cells at the top of the transfer stations into the coil boxes of the conveyor G, or in the alternative, directly into the assembly machine.

The unloading mechanism 48 includes, at each station, a pusher assembly 320 comprising a horizontal thrust bar 322 having secured at its end a depending L-shaped leg 324 of length slightly greater than the height of the coil when the latter is compressed in the cell at the top of the transfer station. On the thrusting movement of the pusher assembly through the cell, the upper end of the leg passes through the slot 298 in the top plate 188 to one side of the operating leaf 300 of the inspector switch 302 (FIGURES 3 and 25). The lower edge of the leg 321 passes through a slot 326 in the upper surface of the transfer station housing and a slot 328 in the face of the plunger, those slots being aligned when the plunger is at the upper end of its stroke, having made a quarter-turn from its lower, coil-receiving position.

Referring still to FIGURE 25, it will be seen that the aligned slots 326 and 328 in the upper surface of the housing and in the face of the plunger are sidewardly offset one way or the other from the center of the cell and that the wider slot 298 in the top plate in the same cell is similarly offset, although the slot in the top plate, in each case, is wide enough to position the operating leaf 300 of the inspector switch above the center of the cell.

Also referring to FIGURE 25, it will be apparent that in the full cell shown in the left hand portion of the drawing, the coil has been elevated into the cell by a plunger which rose with a "left hand screw" motion, positioning the knots at the left side of the cell, whereas in the full cell shown on the right, the coil is delivered by a plunger having a "right hand screw" elevating motion, positioning the knots on the right side of the cell. In each case, the slots, through which the upper and lower ends of the legs 324 sweep, are offset toward the side opposite the knots.

Secured to the depending leg of each thrust bar, by means of a rearwardly directed arm 330 and an angle bracket 332, is a thin pusher blade 334 which extends well forwardly of the front of the depending leg 324 to become interleaved, on the forward stroke of the pusher assembly, between the two endmost convolutions of the coil and to engage the knot of the coil at the convergence of these two convolutions. In view of the fact that the coil springs are all of "right hand thread," so to speak, and have their upper and lower knots in approximate vertical alignment, when the coils arrive in the upper cell of the transfer station with their knots on the left hand side, as viewed from the front of the machine (left hand cell FIGURE 25), the pusher blade must enter from the lower left of the cell in order to engage the knot at the apex of the acute angle between the end and next adjacent convolution. Accordingly, the angle bracket which supports the pusher blade from the depending leg of the pusher assembly extends downwardly and to the left from its point of attachment to that leg.

On the other hand, in the case of a coil which has been elevated by a right hand twisting motion so as to place its knots to the right side of the cell, as illustrated in the right hand cell of FIGURE 25, the rearwardly open acute angle between an end convolution and the next adjacent convolution occurs at the upper knot. Therefore, in those cells where the coils are received with the knots on the right side, the pusher blade 334 is at the top of the cell at the right side, and the angle bracket which supports the blade extends upwardly and to the right from its point of attachment to the leg 324 of the pusher assembly 320.

In both cases, the coil is engaged at three places, i.e., at its top and bottom convolutions on one side of the coil center by the depending leg 324 of the pusher assembly, and by the pusher blade 334 which engages one of the knots on the opposite side of the coil center.

Figure 26:
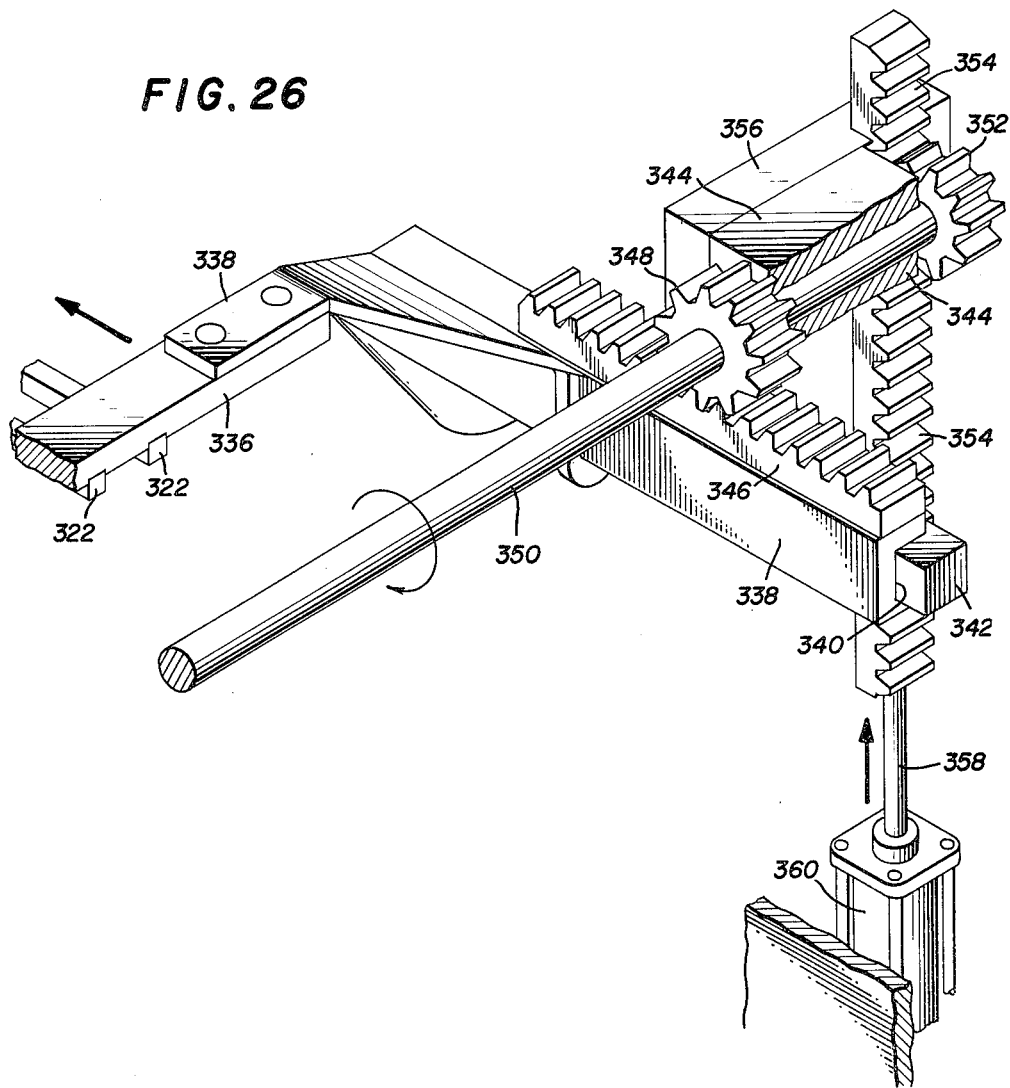
FIGURE 26 is a perspective view of the drive arrangement for the coil ejector mechanism.

All of the several pusher assemblies 320, one for each feeder, are secured to the cross bar 336 of a pusher frame which, as shown in FIGURE 2, more particularly in FIGURE 26, includes slide brackets 338 to which the cross bar is secured at each side of the frame. Each of the slide brackets includes a sidewardly open U-shaped channel or way 340 which encompasses an arbor 342 secured by means of screws to an upstanding bearing bracket 344 mounted on the base frame 52 at each side of the machine. Secured to the top of each of the slide brackets 338 is a rack 346 which meshes with an associated pinion 348 secured to a cross shaft 350 journaled in the bearing brackets 344. At one end of the shaft 350, on the outside of the bearing bracket, a third pinion 352 is engaged by a drive rack 354 slideably contained in a guide bracket 356 secured to the bearing bracket 344, and connected at its lower end to the piston rod 358 of a double acting air cylinder 360. As will be apparent from inspection of FIGURES 2 and 26, the extension stroke of the piston rod 358 elevates the drive rack 354, thereby turning the cross shaft 350 to propel the pusher frame forwardly, and through the several pusher assemblies 320, to eject the reoriented coils from the cells at the tops of the transfer stations.

*Control system*

Figure 27:
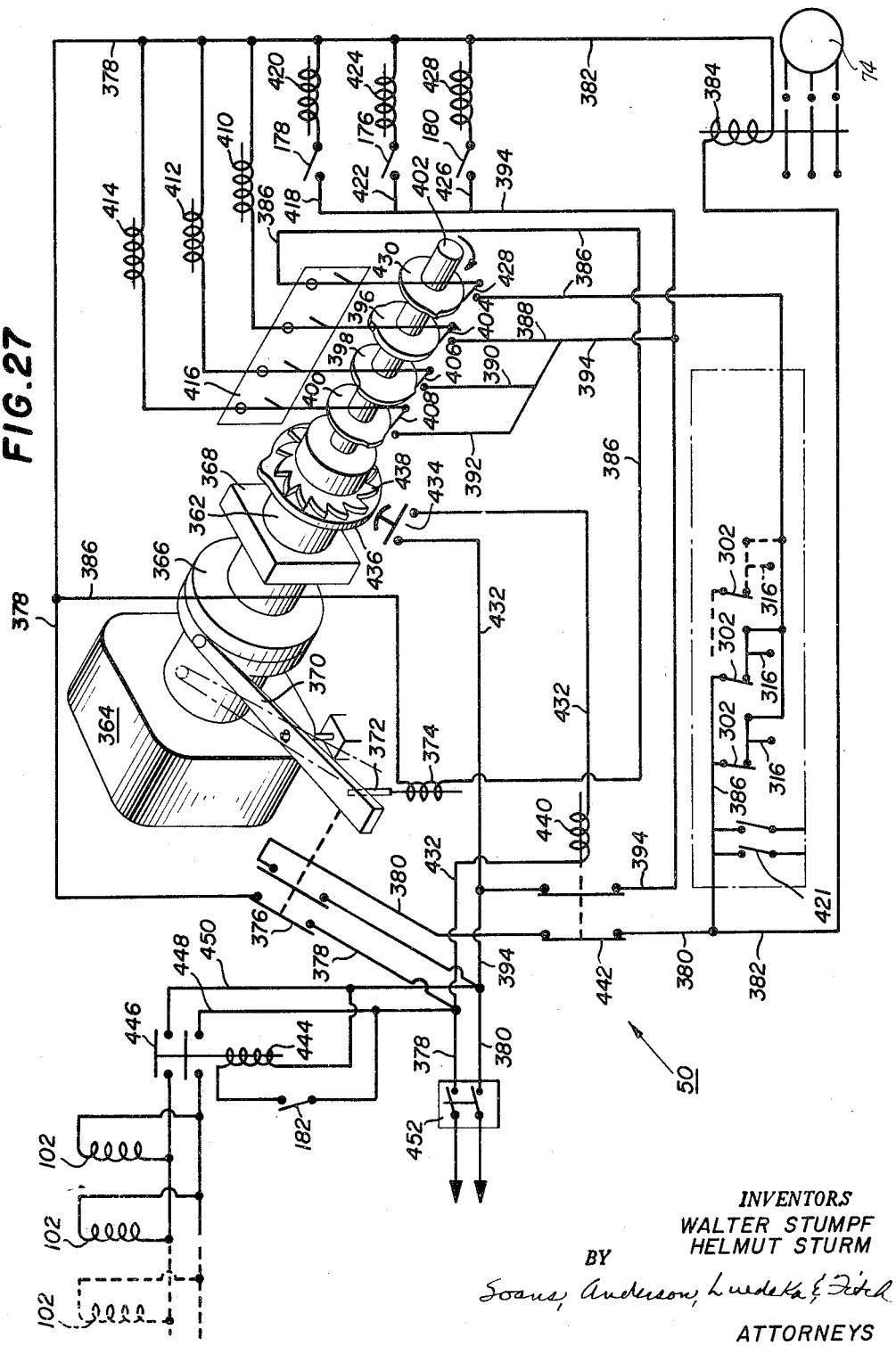
FIGURE 27 is a circuit diagram of the inspector and control system by means of which the various operations of the components are coordinated with each other and with the associated assembly machine.

Inasmuch as the broad purpose of this invention is to provide for automatic feeding of coil springs to a spring assembly machine, the operation and control of the coil feeder is necessarily integrated with the control and operation of the coil assembly machine. While this may be accomplished in a number of ways, the system herein disclosed is adapted to be coupled with the master control of such a machine. For example, in the spring assembly machine shown in United States Patent No. 2,388,106, all of the significant operations are controlled and, in most cases, powered from a master cam shaft 362 which, as shown schematically in FIGURE 27, is driven by an electric motor 364 through a normally open clutch 366 and is provided with a suitable brake 368. The clutch 366 is engaged to drivingly interconnect the motor and the main shaft by an operating lever 370 which is maintained in the drive position by a latch or pin 372 which is controlled by a solenoid 374 and which is normally positioned to engage and hold the clutch operating lever 370 in the clutch engaging position when the lever is shifted manually to engage the clutch.

Mechanically connected to the operating lever 370 is a main, double pole switch 376 which, in general, controls the flow of electrical current through a pair of leads 378 and 380 to the control system. When the operating lever 370 is in drive position, the main switch 376 is closed. However, when the solenoid 374 is energized (as will be explained), the latch 372 is tripped and the operating lever 370 is permitted to swing to allow the clutch to disengage, thereby opening the main switch 376 and, at the same time, disconnecting the shaft 362 from the motor 364.

Connected between the leads 378 and 380 beyond the main switch 376 is a normally closed circuit 382 controlling the operation of the drive motor 74 for the magazine feed chains through a solenoid operated switch 384, and a normally open inspector circuit 386 including the solenoid 374 which controls the operating lever restraining latch 372.

Operation of the discriminator mechanism 44, the plungers 186, and the unloading mechanism 48 are respectively controlled by normally open circuits 388, 390, and 392 which are connected between leads 378 and 394, the latter lead branching from the lead 380 before the main switch 376. The circuits are respectively closed by control cams 396, 398, and 400 which are mounted on an extension 402 of the shaft 362 and operate in sequence with each other and in relation to the operation of the coil assembly machine to respectively close normally open micro-switches 404, 406, and 408. The circuits 388, 390, and 392, when closed, operate to respectively energize solenoid operated valves 410, 412, and 414 which, in turn, control the supply of air to the respective air cylinders 126, 270, and 360, thereby causing, in sequence, advancing and then retracting movement of the sub-frame 124, upward movement of the plungers 186, unloading movement and subsequent retraction of the pusher assemblies 320, and lowering of the plungers for the beginning of the next complete cycle. Each of these circuits can be passed through a control panel 416 which may include a manual switch and pilot light for indicating closed condition of the circuit.

Upward swinging of the picker fingers 104 is controlled by a circuit 418 connected between leads 378 and 394 and including the normally open micro-switch 178 which is closed by movement of the sub-frame 124, and a solenoid 420 in the valve which, when energized, causes introduction of pressure air into the cylinder 142, thereby extending the piston rod 140. Downward rocking of the picker fingers 104 is controlled by a circuit 422 extending between the leads 378 and 394 and including the normally open micro-switch 176 which is also closed by movement of the sub-frame 124, and a solenoid 424 in the valve which, when energized, acts to introduce pressure air into the cylinder 142, thereby retracting the piston rod 140.

Operation of the coil lifters 106 is controlled by a circuit 426 extending between the leads 378 and 394 and including the normally open micro-switch 180 which is closed in response to movement of the sub frame 124, and a solenoid valve 428 which, when energized, introduces pressure air into the cylinder 172, thereby causing retraction of the piston relative to the cylinder and upward movement of the lifters 106.

When the plungers are completely raised and just prior to delivery of the coil springs by the unloading mechanism 48, the inspector circuit 386 operates to check each of the transfer stations 46 for the presence of a coil spring and, in the absence of a coil spring on one of the plungers, or in the absence of complete elevation of the plunger carrying cross beam 266, to shut down the coil feeding and assembly machines. In this connection, each of the series connected normally closed micro-switches 302 and toggle switches 316 carried by the top plate 188 is inserted in parallel in the inspector circuit with each other and with a pair of normally closed micro-switches 421 carried at the ends of one of the vertical bars 191 (see FIGURES 3, 5, and 15). Also included in the circuit 386, in series with the parallel normally closed micro-switches, are a normally open micro-switch 428 controlled by a cam 430 carried on the shaft extension 402, and the solenoid 374 which, when energized, retracts the latch 372 to disengage the clutch 366, thereby opening the main switch 376. Under normal operation when using all 13 stations, each of the toggle switches 316 is closed and when the plungers 186 are fully elevated, the trips 423 (see FIGURES 2, 3, and 15) carried at each end of the cross beam 266 will open the micro-switches 421 and the coil springs carried on the plungers will contact the respective operating leaves 300 to open the microswitches 302. Just prior to closing of the elevator unloading circuit 392, the cam 430 operates to close the micro-switch 428 to check the inspector circuit 386. If any of the stations are empty, the associated inspector micro-switch 302 will remain closed, or if the cross beam 266 is not properly or fully elevated, the micro-switches 421 will remain closed, thereby completing the circuit and energizing the solenoid 374 to shut down the apparatus. However, if each of the stations is filled, the inspector micro-switches will all be open and the circuit to the latch controlling solenoid 374 will not be closed.

In the event it is desired to operate with less than 13 stations, the inspector circuit 386 at any desired station can be disabled by opening the toggle switch 316. If desired, the inspector circuit can be passed through the control panel 416 and include a manual switch and a pilot light for indicating closure of the circuit.

In order to complete the assembly of one spring construction, the machine, described in United States Patent No. 2,388,106, operates, after the assembly of a predetermined number of rows, to prevent the advancement into the assembly machine jaws of the next row of coil springs and to thread a helical wire through the trailing edge of the last row of coil springs in the spring assembly under construction. At this point, it is expediental to interrupt the operation of the coil feeding apparatus for one complete cycle and this is provided by a sequence circuit 432. The sequence circuit is connected between the leads 378 and 380 from a point before the main switch 376, and includes a normally open micro-switch 434 which, in the particular illustrated embodiment, is closed every 25th cycle by a cam 436 carried by a ratchet 438 and which retains the micro-switch closed for one complete cycle of the coil assembly machine. The ratchet 438 is mounted on the shaft 362 and is indexed once for every cycle of the assembly machine, by suitable means such as explained in United States Patent No. 2,388,106. As also explained in said patent, the intermittent advancement of the conveyor can also be interrupted by means associated with the ratchet 438.

The sequence circuit 432 also includes a solenoid 440 which, when the switch 434 is closed, opens a normally closed switch 442 across the leads 380 and 394. As can be seen from FIGURE 27, when the leads 380 and 394 are opened, each of the previously mentioned circuits is opened. Thus, when the switch 442 is opened by the sequence circuit 432, the coil feeding apparatus will remain inactive for one cycle of the coil assembly machine.

Operation of the shaker mechanism 88 for each of the magazines is controlled through the normally open micro-switch 182 which is closed incident to a movement of the sub-frame 124 to thereby energize a solenoid 444 which operates to close a double pole switch 446 inserted across a pair of leads 448 and 450 which connect the individual solenoids 102 of each shaker mechanism with the leads 378 and 380 at a point in advance of the main switch 376.

A switch box 452, as seen both in FIGURES 2 and 27, is incorporated to permit turning off and on of the current to the control system 50.

*Discriminator mechanism—Second embodiment*

Seen in FIGURES 28 through 34 is an alternate discriminator arrangement by which the coil springs in a magazine can be separated, one from another, and loaded into the transfer station. Basically, in this arrangement there is provided, at each station, an inserter finger 460 which functions in the dual role of discriminating between the two forwardmost coils and pushing the lead coil into the transfer station.

Each of the inserter fingers 460 is essentially a generally L-shaped bell-crank lever having a generally vertical depending leg 462 and a generally horizontal leg 464. The upper surface of the horizontal leg is formed with a series of spaced, transversely extending notches 466 which, during movement of the inserter finger toward the transfer station, tend to engage the lowermost convolutions of the forward coil springs and to advance the engaged coil springs toward the stop plate.

Figure 28:
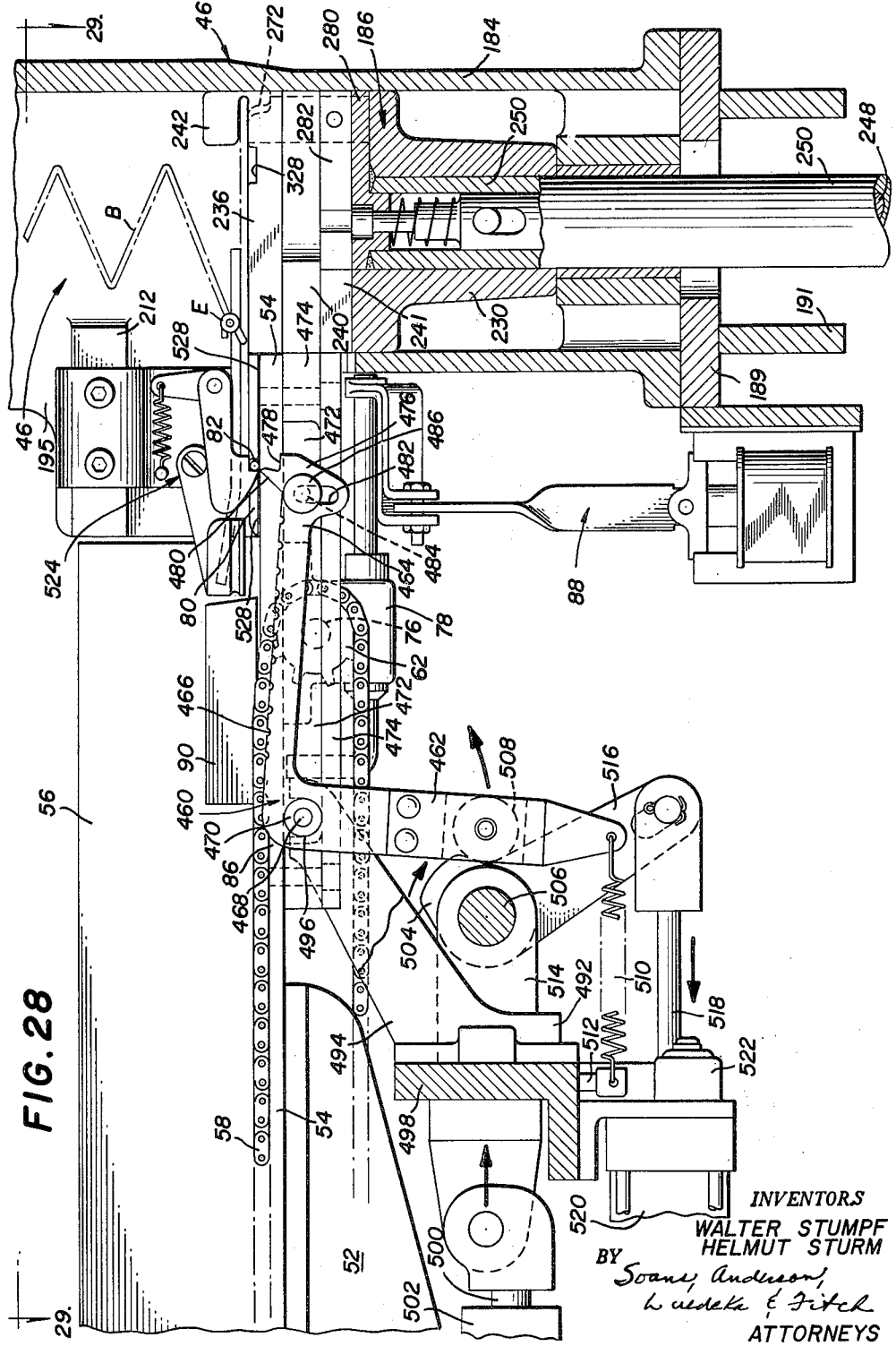
FIGURE 28 is a view similar to FIGURE 5 showing a second arrangement for discriminating between the two forwardmost coil springs in the magazine and for transporting the forwardmost coil spring into the transfer station.

At the juncture of the two legs 462 and 464, the lever is pivoted on a connecting pin or axle 468 of a pair of flanking support rollers 470, each of which is confined in a horizontal slot 472 formed between the underside of the magazine floor plate 54 and one of two track members 474 which are secured to the underside of the floor plate in flanking relation to the central slot 86. As seen in FIGURES 28 and 29, the central slot 86 extends further forwardly toward the front of the magazine than in the first embodiment, and the horizontal leg 464 of the inserter finger extends upwardly into the slot 86.

The tip portion 476 of the horizontal leg 464 is enlarged and notched at its upper end to provide a ledge 478 and an adjacent gable 480. Also included in the enlarged tip portion is a vertical slot 482 which encompasses the connecting pin 484 of a pair of flanking guide rollers 486, which are narrower than the support rollers 470 but are likewise confined in the slots 472. As shown in FIGURE 29, the roller engaging surface of the track members 474 are narrowed at their ends adjacent the transfer station by inward extensions 488 of their respective mounting lugs 490. The extensions 488 form stops for the wider support rollers 470 but permit passage of the guide rollers 486.

Reciprocal movement is imparted to the inserter finger 460 by means of a bracket 492 having two forwardly extending arms 494 which flank the track members 474 and receive, at their ends, the ends of the support rollers 470 in upwardly open yokes 496. The bracket, together with like brackets for each magazine, is secured to a heavy angle-shaped cross beam 498 which is slidably supported at its ends on the base frame beneath the magazines for horizontal reciprocation by the piston rod 500 of a double acting drive cylinder 502. Supply of air to the cylinder 502 is controlled through a normally open micro-switch 522 supported on the cross beam 498 and a solenoid valve, which switch and valve would replace the micro-switch 180 and the solenoid valve 428 in the circuit 426, shown in FIGURE 27. In this embodiment, the circuits 418 and 422 associated with the micro-switches 178 and 176 would not be required.

The inserter fingers 460 are rocked about the axis of the support rollers 470 and upwardly through the slot 86 to the coil springs in the magazines, by means including a series of cams 504 which are fixed on a rotatable cam shaft 506 and which engage roller followers 508 carried on the depending legs 462 of the inserter fingers. Engagement between each cam 504 and cam follower 508 is maintained by a tension spring 510 connected between the lower end of the leg 462 and an anchor stud 512 on the cross beam 498. The cam shaft 506 is rotatably journaled in bearings 514 secured to the cross beam 498 and carries a crank 516 which, in turn, is pivotally connected, in a pin and slot connection to the normally extended piston rod 518 of a double acting air cylinder 520 supported by the cross beam 498. Control of the air supplied to the cylinder 520 would be effected by the cam 394 in the circuit 388 shown in FIGURE 27.

In operation, when the circuit 388 is closed, pressure air is supplied to the cylinder 520 to retract the piston rod 518, thereby causing movement of the cam shaft 506 in the clockwise direction, as seen in FIGURE 28, to rock the inserter fingers counterclockwise and lift the horizontal legs 464 above the magazine floor plates 54. When the piston rod 518 is fully retracted, it closes the micro-switch 522, thereby effecting introduction of pressure air into the drive cylinder 502 to extend its piston rod 500, thereby advancing the inserter fingers 460 into the transfer stations.

The movement of the guide rollers 486 into and through the plunger body 230 is accommodated by the channel 240 extending radially through the plunger body to the central well for the sleeve 250, the floor of the channel being flush with the top of the locking head 280 carried by the sleeve. The central groove 241 in the floor of the channel and the slot 282 in the locking head 280 provide clearance for the inserter finger when the latter is lowered for the withdrawal stroke.

When the circuit 388 is opened, the piston rod 518 is extended relative to its cylinder 520, permitting the springs 510 to rock the inserter fingers downwardly and releasing the operator of the micro-switch 522 to effect reversal of the air pressure in the drive cylinder 502, thereby withdrawing the inserter fingers from the transfer stations to the position shown in FIGURE 28. Cooperating with the inserter finger to separate the lead coil from the magazine (see FIGURE 29) is a pair of knot guides 524 and 526, and an intermediate stop shim 528 which is interleaved between the stop plate 80 and the floor plate 54 and has a concave leading edge 529 in advance of the stop plate edge 82 to assist in keeping the two forwardmost coil springs in spaced relationship.

Figure 33:
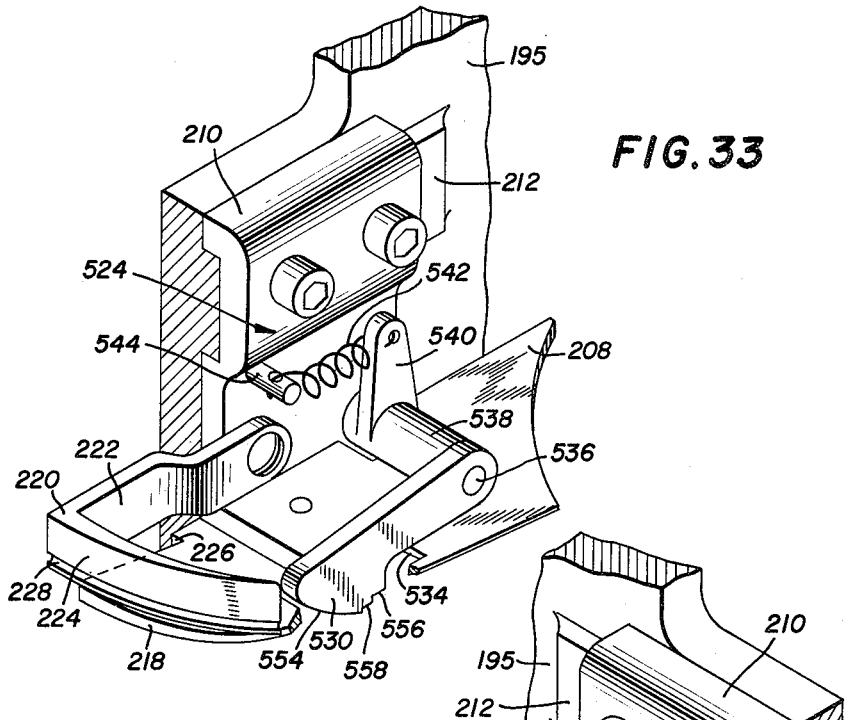
FIGURE 33 is a perspective view of the left knot guide employed in connection with the second discriminator mechanism embodiment.
Figure 34:
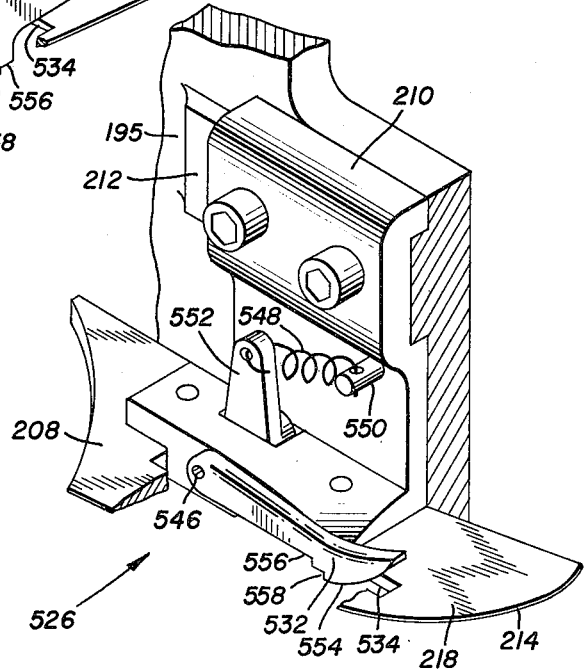
FIGURE 34 is a perspective view of the right knot guide employed in connection with the second discriminator mechanism embodiment.

The knot guides 524 and 526, as seen particularly in FIGURES 33 and 34, are generally similar to the previously described knot guides 204 and 206, but have been modified to include respective pressure fingers 530 and 532, the active ends of which extend downwardly to engage the coil springs beneath the blades 208 through slotted openings 534.

The pressure finger 530 of the left knot guide 524, seen in FIGURE 33, is journaled by means of a pin 536 seated in a boss 538 formed in the mounting bracket 210. Projecting through an opening in the boss, is an arm 540 which is fixed to the pin 536 and which is connected by a spring 542 to a stud 544 on the mounting bracket, thereby biasing the pressure finger 530 downwardly as seen in FIGURE 33.

The pressure finger 532 incorporated in the right knot guide 526 is secured to a pin 546 journaled in the horizontal leg of the mounting bracket 210, and is biased for clockwise movement, as seen in FIGURE 34, by a spring 548 which is connected between a stud 550 fixed in the vertical bracket leg and an arm 552 which is fixed to the rotatable pin 546 and extends upwardly through an opening in the horizontal leg of the bracket 210.

The pressure fingers 530 and 532 each include a curved leading undersurface 554 followed by adjacent upper and lower steps 556 and 558. As seen in FIGURE 30, the pressure fingers are supported, when at rest, by engagement of the upper step 556 with the top of the stop plate 80. In this position, the lower step 558, together with the leading edge 82 of the stop plate, form an opening sufficiently large to accommodate the leading edge of the bottom convolution of the lead coil.

In the discriminating and plunger loading operation, the inserter finger 460, as previously explained, rocks upwardly to lift its horizontal leg 464 through the slot 86 in the magazine bottom plate 54. Incident to this movement, as seen in FIGURE 31, the gable 480 is inserted between the two forwardmost coil springs in the magazine. At the same time, the leading edge of the bottom convolution of the lead coil is engaged by the ledge 478 and is lifted against the action of the pressure fingers 530 and 532 to a height level with the top of the stop plate 80. At this point, the air cylinder 520 drives the inserter fingers toward the transfer stations, as seen in FIGURE 32, advancing the lead coils between the stop plates 80 and the guide blades 208 of the knot guides. When the advancing movement of the inserter fingers is complete, the bottom convolution of the lead coils are seated in the retainers 242 on the plungers 186, the supply of pressure air to the cylinder 502 is reversed, thereby causing downward swinging of the inserter fingers and also reversing the air supply to the drive cylinder 520 to retract the inserter fingers for the next cycle.

During advancing movement of the inserter fingers, the notches 466 engage the second and subsequent coils to carry them forwardly in the magazines. In particular, while the pressure fingers 530 and 532 are raised, the second coil is carried by the inserter finger over the stop ship 528 and against the edge 82 of the stop plate 80, as seen in FIGURE 30, whereas the return of the pressure fingers to their normal positions arrests the third coil at the leading edge 529 of the stop shim 528.

*Conclusion*

By means of the apparatus herein described, wire coil springs are extracted individually from nested stacks in which all of the coils are oriented substantially uniformly, and then selectively reoriented for presentation to an assembly machine in rows in which the knots of the coils are displaced from those edges which will be encompassed by the connective helicals during the assembly of a spring construction, and in rows in which the unidirectional properties of the several coils in the row are substantially balanced.

Various of the patentable features of the invention are set forth in the following claims.

We claim:

1. Apparatus for feeding knotted helical wire spring coils individually from a laterally-nested stack of such coils to a remote point with the knots of said coils in predetermined rotative orientation, comprising a magazine for receiving a laterally-nested stack of such coils with the knots thereof having a generally common rotative orientation in said stack, means for extracting the lead coil from the laterally-nested stack in a forward motion perpendicular to the axis of the coil, means associated with said magazine for orienting said coil during the extraction so that the knot of the coil has a specific rotative orientation relative to the direction of motion of the coil, and a transfer mechanism for receiving said coil at the end of said extraction motion and delivering it to said remote point by further motion including movement perpendicular to said coil axis and with said knots displaced a quarter-turn from the center line of the path of said movement.

2. Apparatus for feeding knotted helical wire spring coils individually from a laterally-nested stack of such coils to a remote point with the knots of said coils in predetermined rotative orientation, comprising a magazine for receiving a laterally-nested stack of such coils with the knots thereof having a generally common orientation in said stack, means for extracting the lead coil from said laterally-nested stack in a forward motion which is perpendicular to the axis of the coil and in which said generally common orientation is maintained, barrier means for restraining the forward motion of the second coil in the laterally-nested stack during the extracting movement of said extracting means to aid in the separation of the lead coil and the second coil, and a transfer mechanism for receiving said coil in said common orientation, rotating the same a quarter-turn on its own axis, and transporting the same to said remote point by further motion including movement in said forward direction.

3. Apparatus for feeding knotted helical wire spring coils individually from a laterally-nested stack of such coils to a remote point with the knots of said coils in predetermined rotative orientation, comprising a magazine for receiving a laterally-nested stack of such coils with the knots thereof having a generally common orientation in said stack, means for extracting the lead coil from said laterally-nested stack in a forward motion perpendicular to the axis of said coil while maintaining said common orientation, a transfer mechanism for receiving said coil in said common orientation, said transfer mechanism including a plunger having face contact with an end convolution of said coil and means thereon to clamp said coil securely to said plunger, and means for reciprocating said plunger to move said coil axially a distance greater than the height of the coil while rotating the same a quarter-turn, and ejector means engageable with said coil at the end of the movement of said plunger for ejecting the same from said transfer mechanism to said remote point by a further motion in said forward direction.

4. Apparatus for feeding knotted helical wire spring coils individually from a laterally-nested stack of such coils to a remote point with the knots of said coils in predetermined rotative orientation, comprising a magazine for containing a laterally-nested stack of such coils in axially upright position and with the knots thereof in generally common orientation in said stack, means for extracting the lead coil from said laterally-nested stack in a forward motion with said coil upright and maintaining said common orientation, means connected to said magazine for vibrating the coils at a location in the magazine adjacent said extracting means to facilitate separation of the lead coil from the laterally-nested stack, a transfer station including a vertically movable plunger normally positioned to receive said coil from said extracting means with the bottom convolution of said coil resting on the face of the plunger, and means for raising said plunger a distance greater than the height of said coil to an upper position and rotating the coil a quarter-turn as an incident to said elevation, said plunger including means for clamping the lower convolution of the coil to the face of the plunger as an incident to the initiation of said upward movement and for releasing the same at said upper position, and ejector means engageable with said coil at said upper position to eject the same from said transfer station to said remote point by a further motion in said forward direction.

5. In an apparatus for feeding helical wire spring coils, a magazine for containing and advancing therein a stack of laterally-nested spring coils, said magazine including a plate having thereon a concave abutment engageable by the end convolution of the lead coil of said stack to arrest the movement thereof, means for separating the lead coil from the stack including a member insertable into said magazine through said plate in a direction parallel to the axes of said coils to engage the leading edge of the end convolution of the lead coil emplaced against said abutment and to disengage the same from said abutment, and a reciprocable picker finger insertable into said magazine from the end thereof toward which said coils advance, said picker finger having a serrated tip portion which overlies said end convolutions of the coils adjacent the lead coil and a notch which overlies said leading edge of the lead coil emplaced against said abutment when said finger is fully inserted, means for moving said picker finger toward said plate to effect engagement of said serrated edge with said adjacent coils and said notch with said lead coil when the latter has been disengaged from said abutment and for withdrawing said picker finger from the magazine, whereby said lead coil is extracted from the magazine.

6. In apparatus for feeding helical wire spring coils, a magazine for containing a stack of laterally-nested spring coils, said magazine being trough shaped and having a floor plate upon which said coils stand axially upright, an abutment plate secured flat to said floor plate at one end of the magazine and having a concave edge adapted to receive the leading edge of the lower convolution of the lead coil in the magazine, means in the magazine for advancing said nested coils toward said abutment plate, a coil lifter insertable upwardly into said magazine through said floor plate in front of said abutment plate to elevate the leading edge of the lead coil from said floor plate to the level of the surface of said abutment plate, said coil lifter having thereon a wedge insertable between the leading edges of the lower convolutions of the lead coil and the next adjacent coil when the former is emplaced against said abutment plate, and a picker finger reciprocably insertable into said magazine axially thereof from one end in overlying relation to the bottom convolutions of the foremost coils in said magazine, said picker finger having a serrated tip portion overlying the leading edge of the bottom convolution of said next adjacent coil and a notch overlying the leading edge of the lower convolution of said lead coil emplaced against the abutment plate, means for inserting said coil lifter and said picker finger and moving said picker finger down to engage said serrated edge with said next adjacent coil and said notch when said lead coil, retracting said picker finger from said magazine, and retracting said coil lifter immediately after the commencement of said picker finger retraction movement, whereby said lead coil is extracted from said magazine and said next adjacent coil is emplaced against said abutment plate.

7. The structure of claim 6 in which the coil lifter is insertable into the magazine on the center line thereof, the picker finger likewise, and the coil lifter is provided with a central slot to receive the tip of the picker finger when the latter engages said foremost coils.

8. In an apparatus for feeding helical wire spring coils, a magazine for containing and advancing therein a stack of inter-fitted spring coils, said magazine having therein an abutment engageable with an end convolution of the lead coil in the stack to arrest the movement thereof, means associated with said magazine for separating the lead coil from the stack including means exerting pressure against the end convolutions of the foremost coils in said stack in a direction generally perpendicular to the planes thereof and tending to maintain the engagement of the lead coil with said abutment, a wedge member insertable into said magazine between the leading edges of the end convolutions of said lead coil and the next adjacent coil and in a direction opposite to the direction of said pressure, said wedge member having a ledge engageable with said lead coil upon said insertion to disengage the same from said abutment, and means for moving said wedge member longitudinally of said magazine to remove said lead coil from said stack.

9. In apparatus for feeding helical wire spring coils, a magazine for containing a stack of laterally-nested spring coils, said magazine being trough shaped and having a floor plate upon which said coils stand axially upright, an abutment plate secured flat to said floor plate at one end of the magazine and having a concave edge adapted to receive the leading edge of the lower convolution of the lead coil in the magazine, means for advancing said nested coils toward said abutment plate, means for maintaining on at least the foremost coils in said stack a downward pressure on said lower convolutions against said floor plate, an inserter finger normally recessed in the floor plate of said magazine and reciprocable longitudinally thereof, said inserter finger having a ledge engageable with the underside of the leading edge of said lead coil and an upstanding projection insertable behind said leading edge, and means for raising said ledge to the level of the surface of said abutment plate against said downward pressure, and for advancing said inserter finger to remove said coil from said stack.

10. In apparatus for feeding helical wire spring coils, a magazine for containing a stack of laterally-nested spring coils, said magazine being trough shaped and having a floor plate upon which said coils stand axially upright, an abutment plate secured flat to said floor plate at one end of the magazine and having a concave edge adapted to receive the leading edge of the lower convolution of the lead coil in the magazine, means for advancing said nested coils toward said abutment plate, means for maintaining on at least the forwardmost coils in said stack a downward pressure on said lower convolutions against said floor plate, an inserter finger normally recessed in said floor plate and reciprocable longitudinally thereof, said finger having a ledge engageable with the underside of the leading edge of the lower convolution of said lead coil emplaced against said abutment plate, an upstanding projection insertable between the leading edges of the lower convolutions of said lead coil and the next adjacent coil, and a serrated edge engageable with the underside of the leading edge of said next adjacent coil, and means for raising said finger to lift the leading edge of the lower convolution of said lead coil to the level of the surface of said abutment plate and to engage said next adjacent coil, and for advancing said inserter finger to remove said lead coil from the stack and to emplace said next adjacent coil against said abutment plate.

11. In apparatus for handling knotted helical wire spring coils, means for imparting to said coils a uniform rotative orientation on their axes comprising an upwardly open channel member for supporting said coils therein in the axially upright condition with the end convolutions of said coils resting on the floor of said channel and confined by the sides thereof, means for advancing said coils individually in said channel, means for imparting successively to each coil a uniform rotative orientation on its own axis as an incident to said advancing movement comprising opposed plates extending into said channel from the sides thereof in closely spaced parallel relation to said floor to admit the end convolution of a coil into the spaces between said floor and said plates but to reject the knot, said plates being spaced apart to define between them a central passage of width sufficient to pass the knot, one of said plates extending into the apex of the convergence of the end convolution and next adjacent convolution at the knot of an advancing coil and having a front edge which extends inwardly from the adjacent side of the channel member and recedes in the direction of said advancing movement and in a smooth convex curve to said central passage, whereby a coil knot displaced toward said adjacent side of the channel is engaged by the edge of said one plate and cammed into said central passage by said advancing movement, said one plate tapering down in thickness from both surfaces thereof toward said edge, the other of said plates having at its forward edge a keeper having a generally upright front face which extends inwardly from its adjacent side of said channel and recedes in the direction of said advancing movement and in a smooth convex curve to said central passage, said keeper having a rearwardly extending arm pivoted at a level above said face of the keeper on an axis transverse of said channel for up and down movement thereof, said arm normally supporting the keeper sufficiently above said floor to pass the end convolution of a coil but to engage a knot displaced toward its side of said central passage, whereby said keeper is urged downwardly by the engagement therewith of a knot to ride upon the underpassing end convolution of a coil and to cam such knot into said central passage as an incident to said advancing movement.

12. In apparatus for feeding helical wire spring coils, means for delivering a spring coil to a location with a desired angular orientation thereof, which means comprises a tubular housing for receiving a spring coil, a plunger reciprocable in said housing axially thereof, upstanding hook means on said plunger engageable with an end convolution of a spring coil, means for imparting axial movement to said plunger, said housing and said plunger having interengaging parts for rotating said plunger in response to axial movement of said plunger in said housing, and means connected to said plunger for releasably clamping said spring coil to said plunger in cooperation with said hook means, said clamping means being operable in response to said axial movement to clamp the coil at the beginning of said axial movement and to release said coil at the end of said movement.

13. In apparatus for feeding helical wire spring coils, means for delivering a spring coil to a location with a desired angular orientation thereof, which means comprises a tubular housing for receiving a spring coil in axial alignment therewith, a plunger reciprocable in said housing axially thereof, said housing serving as a cylinder for said plunger, means on said plunger engageable with an end convolution of a spring coil, means for feeding a coil into said tubular housing and into engagement with said engageable means, and means for imparting axial movement to said plunger, said housing and said plunger having interengaged parts for rotating said plunger in response to axial movement of said plunger in said housing, means connected to said plunger for releasably clamping said spring coil to said plunger in cooperation with said engageable means, said clamping means being operable in response to said axial movement to clamp the coil at the beginning of said axial movement and to release said coil at the end of said movement, and means for removing said coil from said plunger and transferring it to the delivery location.

14. In apparatus for handling knotted, helical wire spring coils, means for imparting uniform rotative orientation to a coil incident to movement in a direction perpendicular to its axis, which means comprises means defining a path along which helical wire spring coils are adapted to travel, said path-defining means including a flat surface portion, means for moving a spring coil in a predetermined direction along said path with an end convolution of the spring coil in face contact with said surface portion, a pair of opposed flat barrier plates mounted on said path-defining means and extending into said path at a position spaced from said flat surface a distance slightly greater than the thickness of said wire, said barrier plates having arcuate front edges which converge in the predetermined direction of movement and form a central passageway through which the knot of the spring coil is adapted to pass, one of said plates extending into the apex of the convergence of the end convolution and the next adjacent convolution of an advancing spring coil to engage a knot offset to its side of said central passageway, a keeper positioned near the other of said plates which extends into said path and has a face curved inwardly toward the center of said path for engaging an advancing coil knot offset to its side of said central passageway, and means pivotally mounting said keeper on said path-defining means about an axis generally parallel to said flat surface, which axis is spaced further from said surface than said keeper face, whereby sidewardly offset knots are cammed by said one plate or by said keeper into said central passageway, rotating the coil on its axis incident to said camming.

15. In an apparatus for feeding knotted helical wire spring coils one at a time from a laterally-nested stack of such coils, a magazine having a floor plate and upright spaced walls defining between them a channel for confining said stack of spring coils each with its axis perpendicular to said floor plate, means for advancing the coils in the magazine, an upward step in the floor plate at the end of the magazine toward which the coils advance, said step being conformed to the shape of the end convolution on which the coils stand and having a height at least equal to the thickness of the spring wire thereby to form an abutment to intercept the leading edge of the bottom convolution of the lead coil, a pair of opposed ledges extending into said channel from said walls above said floor plate, said ledges extending fore and aft in the magazine from said step and being spaced sufficiently above said step to define therewith slots of height slightly greater than said wire thickness, said ledges being interleaved with each advancing coil overlying only the bottom convolution thereof, and discriminator means including an upwardly extending wedge insertable into said magazine upwardly through said floor plate at a distance of one wire thickness in front of said step to separate the leading edge of the lead coil from that of the next coil and to lift the leading edge of said lead coil to the level of the step for extraction through said slots.

16. Apparatus for feeding knotted helical wire spring coils individually from a laterally-nested stack of such coils to a remote point with the knots of said coils in predetermined rotative orientation, comprising a magazine for containing a laterally-nested stack of such coils, means for extracting the lead coil from the laterally-nested stack in a forward motion perpendicular to the axis of the coil, means associated with said magazine for orienting said coil during the extraction thereof so that the knot of the coil has a specific rotative orientation relative to the direction of motion of the coil, barrier means for restraining the forward motion of the second coil in the laterally-nested stack during the extracting motion of said extracting means to aid in the separation of the lead coil and the second coil, and transfer means for receiving said coil at the end of said extracting motion and delivering it to said remote point by further motion including movement perpendicular to said coil axis and with said knot displaced a quarter-turn of the coil from the center line of the path of said movement.

17. In apparatus for feeding helical wire spring coils, a magazine for containing and advancing therein a stack of laterally-nested spring coils, said magazine including a plate engaging the end convolutions of the nested coils and having thereon an abutment engageable by the end convolution of the lead coil of said stack to arrest the movement thereof, means for separating the lead coil from the stack including a coil lifter insertable into said magazine through said plate in a direction parallel to the axes of said coils to engage the leading edge of the convolution of a coil emplaced against said abutment and to disengage the same from said abutment, and a reciprocable picker finger insertable into said magazine from the end thereof toward which said coils advance, said picker finger having a notch which overlies the leading edge of said end convolution of said coil emplaced against said abutment when said finger is fully inserted, said notch being only deep enough to receive a single wire thickness, and means for inserting said picker finger and moving said picker finger toward said plate to effect engagement of said notch with the leading edge of said end convolution of a coil and for withdrawing said picker finger from said magazine, and means operating with a predetermined force for inserting said coil lifter into said magazine, said picker finger actuating means being operated with a greater force than said predetermined force so that said picker finger dominates said coil lifter causing partial withdrawal of said coil lifter in the event that one interferes with the opposing movement of the other.

18. In apparatus for feeding helical wire spring coils, a magazine for containing a stack of laterally-nested spring coils, said magazine having means for advancing the stack of laterally-nested coils therein in a direction transverse to the coil axes, said magazine also having therein an abutment engageable with the leading edge of an end convolution of the lead coil in the stack to arrest the advancing movement thereof, and means associated with said magazine for separating the lead coil from the stack, said separating means including means engageable with the leading edge of the lead coil for disengaging the same from said abutment, other means engageable with the leading edge of the end convolution of the lead coil and with the leading edge of an end convolution of the second coil in the stack for transporting the lead coil past said abutment and for moving the second coil in said direction and emplacing the leading edge thereof against said abutment, and means for actuating said other means after the disengagement of the lead coil from said abutment.

References Cited by the Examiner

UNITED STATES PATENTS

| | | | |
|---|---|---|---|
| 230,638 | 8/80 | King | 221—210 X |
| 1,590,926 | 6/26 | Cooley | 221—40 |
| 1,609,802 | 12/26 | Ekstrom | 198—24 |
| 1,627,837 | 5/27 | Cooley | 221—39 |
| 1,962,902 | 6/34 | Kunath | 221—210 X |
| 2,089,055 | 8/37 | Flaws | 221—210 X |
| 2,092,916 | 9/37 | Hildebrand. | |
| 2,275,209 | 3/42 | Turgeon | 140—92.8 |
| 2,349,523 | 5/44 | Sonnenberg | 221—262 X |
| 2,388,106 | 10/45 | Woller | 140—92.7 |
| 2,470,812 | 5/49 | Gauci et al. | 140—92.8 |
| 2,494,349 | 1/50 | Mittermaier | 29—211 X |
| 2,591,203 | 4/52 | Schmalz. | |
| 2,716,308 | 8/55 | Hodges | 140—3 X |
| 2,734,674 | 2/56 | Ray | 221—262 X |
| 2,815,148 | 12/57 | Day et al. | 221—173 |
| 2,856,969 | 10/58 | Waful | 140—102 |

RAPHAEL M. LUPO, *Primary Examiner.*

NEDWIN G. BERGER, RICHARD A. WAHL, LOUIS J. DEMBO, *Examiners.*